(12) United States Patent
Yun et al.

(10) Patent No.: US 7,959,752 B2
(45) Date of Patent: Jun. 14, 2011

(54) METHOD FOR PRODUCING GEOGRID

(75) Inventors: Kwang-Jung Yun, Daejeon (KR);
Seong-Ho Cho, Daejeon (KR);
Dong-Hwan Cha, Daejeon (KR);
Se-Whan Choi, Daejeon (KR)

(73) Assignee: Samyang Corporation, Seoul (KR)

( * ) Notice: Subject to any disclaimer, the term of this patent is extended or adjusted under 35 U.S.C. 154(b) by 1013 days.

(21) Appl. No.: 10/538,468

(22) PCT Filed: Dec. 30, 2003

(86) PCT No.: PCT/KR03/02906
§ 371 (c)(1),
(2), (4) Date: Jun. 8, 2005

(87) PCT Pub. No.: WO2005/064061
PCT Pub. Date: Jul. 14, 2005

(65) Prior Publication Data
US 2006/0116040 A1 Jun. 1, 2006

(51) Int. Cl.
*B29C 65/00* (2006.01)
*B32B 37/00* (2006.01)
*G01M 1/00* (2006.01)

(52) U.S. Cl. ...... 156/73.1; 156/73.2; 156/580; 405/284; 405/262

(58) Field of Classification Search .................. 156/73.6, 156/73.1, 73.5, 3.6, 580; 405/129.8, 262, 405/270, 284, 286, 302.4, 302.6, 258, 287, 405/302.7; 442/1, 2, 49, 220, 310, 331; 428/107, 428/113; 264/136, 171.6
See application file for complete search history.

(56) References Cited

U.S. PATENT DOCUMENTS

| 3,535,180 A | | 10/1970 | Gasaway | |
|---|---|---|---|---|
| 3,909,170 A | * | 9/1975 | Riboulet et al. | 425/133.5 |
| 4,095,619 A | * | 6/1978 | Kallmeyer | 139/22 |
| 4,643,119 A | * | 2/1987 | Langston et al. | 112/421 |

(Continued)

FOREIGN PATENT DOCUMENTS

AT 365673 2/1982

(Continued)

OTHER PUBLICATIONS

Thermosonics, Ultrasonic Equipment. Copyright 1196-2008. Published by Applegate. http://www/applegate.co.uk.*

(Continued)

*Primary Examiner* — Angela Ortiz
*Assistant Examiner* — Altrev C Sykes
(74) *Attorney, Agent, or Firm* — Edwards Angell Palmer & Dodge LLP; Kongsik Kim

(57) ABSTRACT

A geogrid using fiber-reinforced polymeric strips and its producing method are disclosed. The geogrid of a lattice shape includes plural longitudinal fiber-reinforced polymeric strips longitudinally arranged in parallel at regular intervals and formed by reinforcing fiber in a thermoplastic polymer resin, and plural lateral fiber-reinforced polymer strip laterally arranged in parallel at regular intervals and formed by reinforcing fiber in a thermoplastic polymer resin. Each longitudinal fiber-reinforced polymer strip has at lease one first contact point crossed with the lateral fiber-reinforced polymer strip on the upper surface and at least one second contact point crossed with the lateral fiber-reinforced polymer strips on the lower surface. The contact points are fixed by welding the longitudinal and lateral fiber-reinforced polymer strips. The geogrid is excellent in installation capacity, frictional feature and shape stabilisation and shows high tensile strength and low tensile strain and low creep deformation.

14 Claims, 14 Drawing Sheets

U.S. PATENT DOCUMENTS

| | | | |
|---|---|---|---|
| 4,960,349 A * | 10/1990 | Willibey et al. | 405/262 |
| 4,980,227 A * | 12/1990 | Sekiguchi et al. | 442/3 |
| 5,056,960 A * | 10/1991 | Marienfeld | 405/270 |
| 5,669,796 A * | 9/1997 | Harford | 442/220 |
| 5,735,640 A * | 4/1998 | Meyer et al. | 405/302.7 |
| 5,836,715 A * | 11/1998 | Hendrix et al. | 404/134 |
| 5,965,467 A * | 10/1999 | Stevenson et al. | 442/218 |
| 6,045,923 A * | 4/2000 | Kok et al. | 428/517 |
| 6,171,984 B1 * | 1/2001 | Paulson et al. | 442/331 |
| 6,707,885 B2 * | 3/2004 | Wimberger-Friedl et al. | 378/154 |
| 2008/0066847 A1 | 3/2008 | Heerten et al. | |

FOREIGN PATENT DOCUMENTS

| | | |
|---|---|---|
| CN | 2575158 Y | 9/2003 |
| CN | 2559687 Y | 7/2008 |
| DE | 1930029 | 3/1971 |
| EP | 0 174 792 | 3/1986 |
| EP | 0441719 | 8/1991 |
| EP | 1 038 654 | 3/2000 |
| EP | 1 275 489 | 1/2003 |
| GB | 1 210 060 | 10/1970 |
| JP | 2001078187 | 3/2001 |
| JP | 2003027483 | 1/2003 |
| SU | 895582 | 1/1982 |
| WO | 98/55682 | 12/1998 |
| WO | WO 9928563 A1 * | 6/1999 |

OTHER PUBLICATIONS

TWI Plastics joining—Radio Frequency Welding Technique. Copyright 2008. http://www.twi.co.uk/content/pjkrfweld.html.*

International Search Report for Corresponding Application No. PCT/EP 98/02980 completed on Aug. 28, 1998 and mailed on Sep. 11, 1998.

* cited by examiner

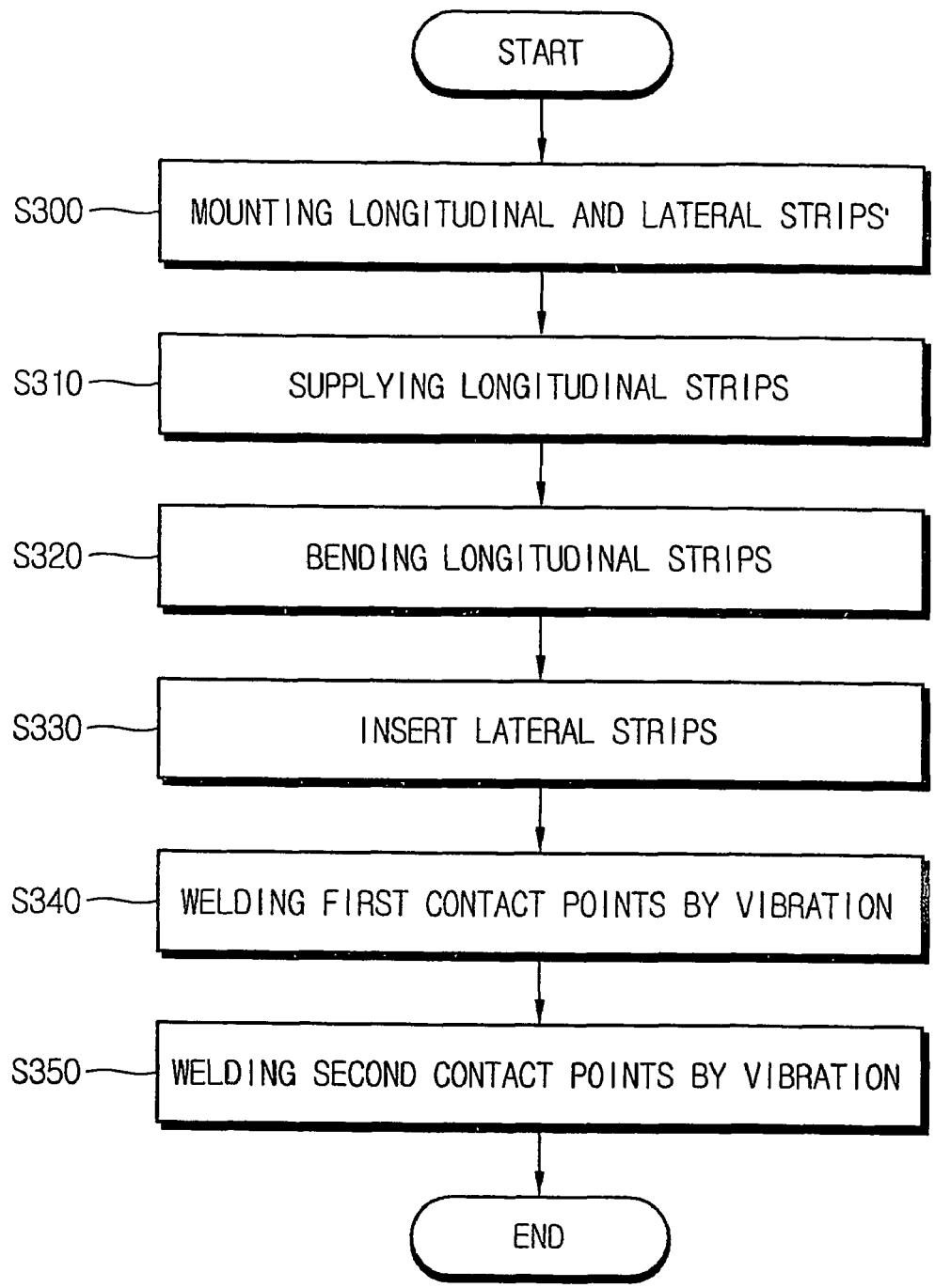

FIG. 10a
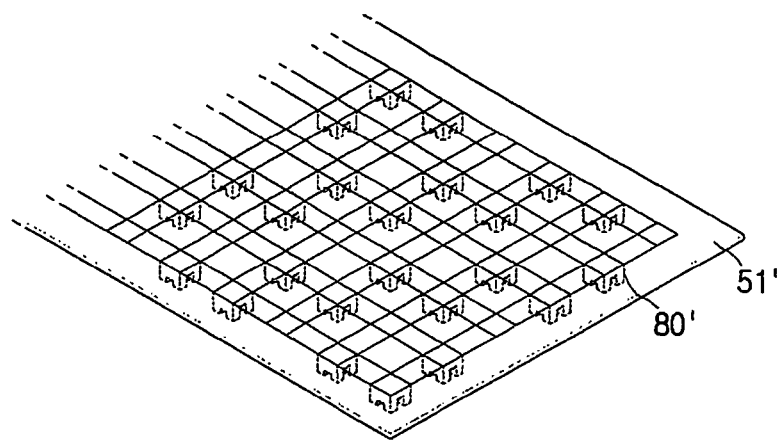
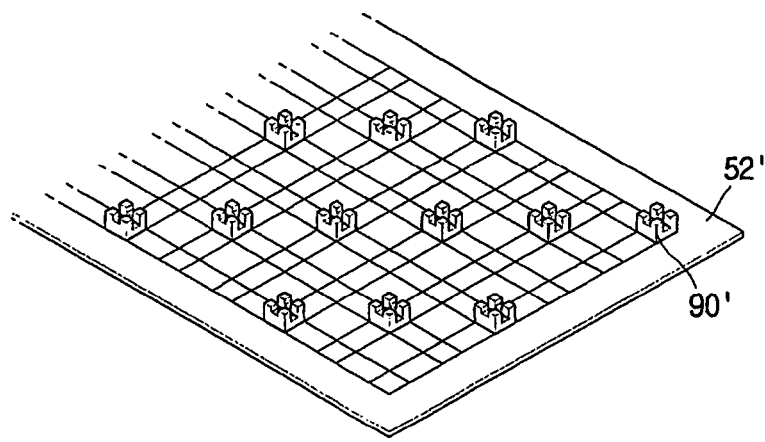
FIG. 10b
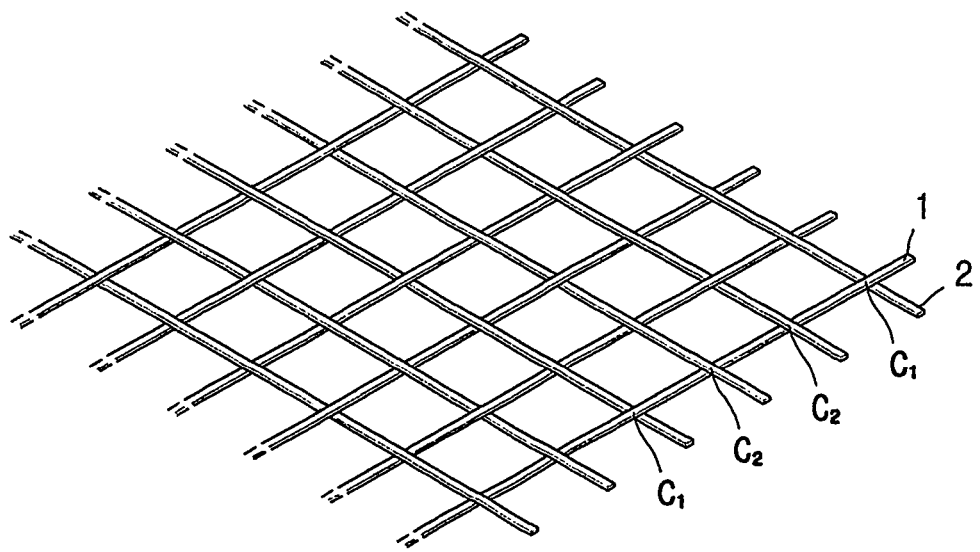

METHOD FOR PRODUCING GEOGRID

TECHNICAL FIELD

The present invention relates to a geogrid mainly used as a reinforcing material and its producing method.

BACKGROUND ART

A geogrid is commonly used for reinforcement of soil retaining wall, slope and weak ground in the civil engineering works. The geogrid needs to have some properties such as resistance to installation damage, friction feature and shape stability in addition to high tensile strength, low tensile stain and low creep strain. The geogrid is classified into plastic geogrid and textile geogrid according to its material and producing method.

The plastic geogrid is produced by passing a polymer sheet, extruded through an extruder, between rollers to perforate holes at regular intervals and then elongating the polymer sheet by one or two axes (see GB 19890020843), or produced by making lateral strips and longitudinal strips, which are made by extrusion-elongating polymer resin in a strip shape, into a flat lattice shape and then adhering the strips with the use of laser or frictional heat (see GB 2266540). However, the plastic geogrid shows serious creep strain when a load is applied for a long time thereto due to its material characteristics, thereby possibly causing deterioration of structural stability.

The textile geogrid is produced by weaving a lattice-type fabric with the use of high-tenacity fibers and then coating the fabric with polyvinylchloride, bitumen, acryl, latex, rubber resin or the like. The textile geogrid shows excellent tensile strength and creep characteristics owing to the usage of high-tenacity fibers. However, the textile geogrid is likely to be damaged depending on the state of soil in construction, so installation resistance is deteriorated. In addition, the textile geogrid is also not economically desirable since the producing procedure is too complex.

Meanwhile, WO 99/28563 discloses a method for producing a geogrid in which longitudinal strips made of fiber-reinforced polymer strips and lateral strips made of thermoplastic polymer resin strips are adhered in a lattice shape. In this document, it is disclosed that the thermoplastic polymer resin is extruded and inserted to form and adhere the lateral strips and to the longitudinal strips while the longitudinal fiber-reinforced polymer strips are moving, and the fiber-reinforced polymer strips may be inserted to the lateral strips. However, if the fiber-reinforced polymer strips are adhered in such a way, the fibers existing in the polymer may be damaged to deteriorate their tensile properties, and perfect adhesion between the strips is substantially not realized since the longitudinal and lateral polymer strips are not all in a melted state. In addition, since the geogrid in the aforementioned document has a flat structure, the geogrid has inferior friction behavior and unsatisfactory shape stability against a vertical load.

DISCLOSURE OF INVENTION

The present invention is designed to solve the problems of the prior art, and therefore an object of the invention is to provide a geogrid which is capable of giving high tensile strength, low tensile strain and low creep strain in addition to excellent resistance to installation damage, friction behavior and shape stability.

In addition, another object of the invention is to provide a method for producing the above-mentioned geogrid in mass production at a low cost.

In order to accomplish the above object, the present invention provides a geogrid which includes a plurality of longitudinal fiber-reinforced polymer strips arranged longitudinally in parallel at regular intervals, the longitudinal fiber-reinforced polymer strip being configured so that a fiber is reinforced in a thermoplastic polymer resin; and a plurality of lateral fiber-reinforced polymer strips arranged laterally in parallel at regular intervals, the lateral fiber-reinforced polymer strip being configured so that a fiber is reinforced in a thermoplastic polymer resin, wherein each of the longitudinal fiber-reinforced polymer strips has at least one first contact point which is crossed with one of the lateral fiber-reinforced polymer strips on an upper surface thereof, and at least one second contact point which is crossed with another one of the lateral fiber-reinforced polymer strips on a lower surface thereof, wherein the thermoplastic polymer resin of the longitudinal fiber-reinforced polymer strip and the thermoplastic polymer resin of the lateral fiber-reinforced polymer strip are welded and fixed at the contact points.

Since the longitudinal and lateral fiber-reinforced polymer strips are alternatively arranged up and down and their cross contact points are welded and fixed to increase resistance against vertical load and frictional force with a reinforced material such as soil, the geogrid of the present invention gives excellent shape stability and superior installation resistance. In addition, since the geogrid of the present invention uses the fiber-reinforced polymer strip which is reinforced with fibers in a polymer resin, the geogrid of the present invention shows high tensile strength low tensile strain and low creep strain.

The geogrid of the present invention may maximize its properties when the plurality of longitudinal fiber-reinforced polymer strips and the lateral fiber-reinforced polymer strips are crossed in a plain weave structure so that the first and second contact points are alternatively positioned in turns.

BRIEF DESCRIPTION OF THE DRAWINGS

These and other features, aspects, and advantages of preferred embodiments of the present invention will be more fully described in the following detailed description, taken accompanying drawings. In the drawings:

FIGS. 7a to 7d are side views and plane views schematically showing a welding unit in the geogrid producing apparatus according to an embodiment of the present invention, in which FIGS. 7a and 7b show a first welder and FIGS. 7c and 7d show a second welder;

FIG. 9 is a flowchart for illustrating the method of producing a geogrid with the use of the fiber-reinforced polymer strips according to an embodiment of the present invention;

FIGS. 10a to 10d are perspective views showing a strip arranging unit according to another embodiment of the present invention and a geogrid structure arranged by the strip arranging unit;

BEST MODES FOR CARRYING OUT THE INVENTION

Hereinafter, preferred embodiments of this present invention will be described in detail with reference to the accompanying drawings. However terms and vocabularies used herein should not be construed as limited to general and dictionary meanings but as based on the meanings and concepts in accordance with the spirit and scope of the invention on the basis of the principle that the inventor is allowed to define terms as the appropriate concept for the best explanation. Therefore, the description herein should not be construed as limiting the scope of the invention but as merely providing illustrations of the presented embodiments of this invention. Therefore, it will be understood that other variations and modifications could be made thereto without departing from the spirit and scope of the invention.

Figure 1:
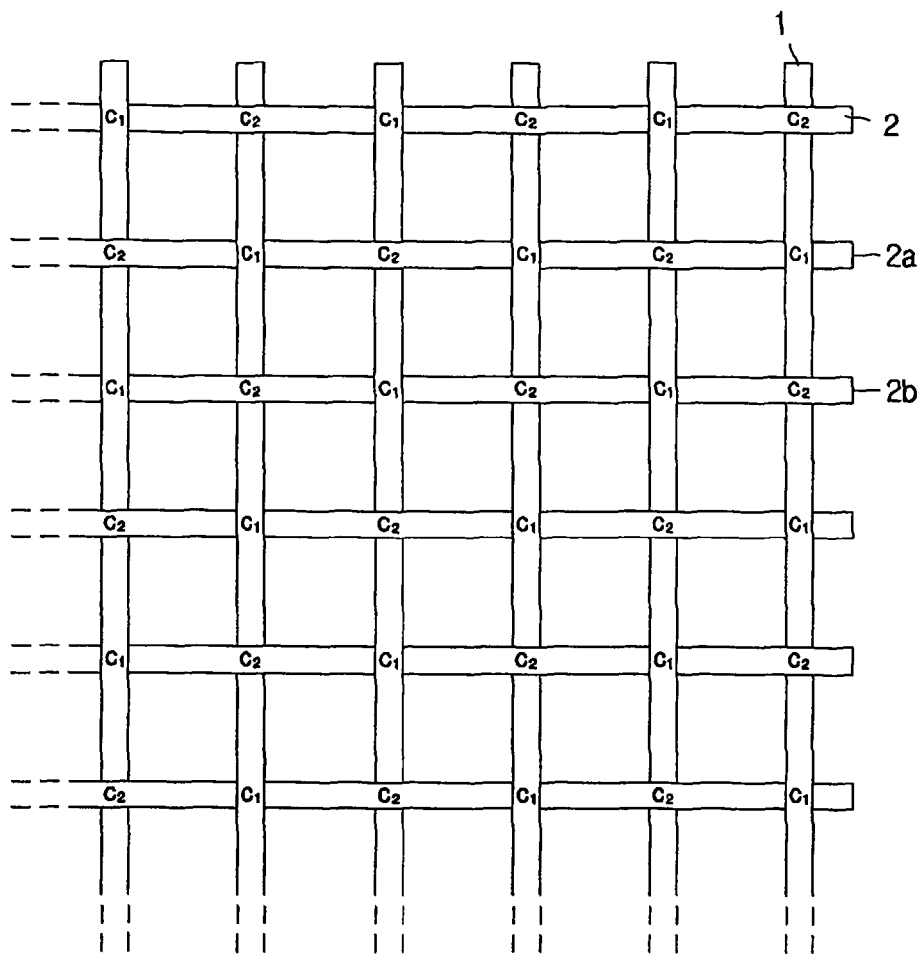
FIG. 1 is a plane view showing a geogrid according to an embodiment of the present invention.

FIG. 1 is a plane view showing a geogrid according to a preferred embodiment of the present invention. Referring to FIG. 1, the geogrid of this embodiment has a lattice shape, which includes a plurality of longitudinal fiber-reinforced polymer strips 1 arranged in parallel at regular intervals along a longitudinal direction, and a plurality of lateral fiber-reinforced polymer strips 2 arranged in parallel at regular intervals along a lateral direction.

The terms "longitudinal" and "lateral" would be understood to those ordinarily skilled in the art to respectively mean a first direction and a second direction, which are crossed with each other. However, in the present invention, the longitudinal and lateral directions are not limited to the case that they are crossed perpendicularly, but an angle between two directions may be suitably selected in the range of which the geogrid may disperse loads and show sufficient pullout force. In addition, though a cross point (or, a contact point) is described for the lateral direction on the basis of the longitudinal direction in the present invention, it is a relative concept and it should be understood that this principle may be identically applied on the basis of the lateral direction.

Figure 2:
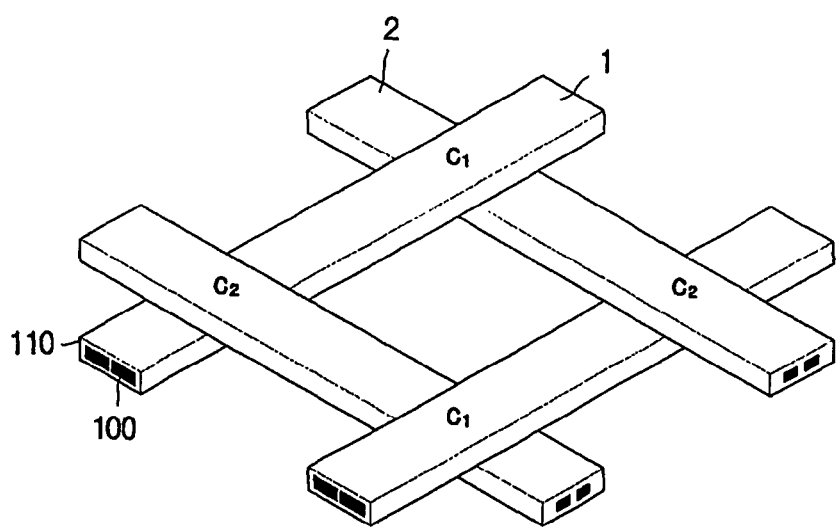
FIG. 2 is an enlarged perspective view showing a part of the geogrid according to an embodiment of the present invention.

According to the present invention, the longitudinal fiber-reinforced polymer strips 1 and the lateral fiber-reinforced polymer strips 2 are crossed with each other in turns. Specifically, referring to FIG. 1 and FIG. 2 which is an enlarged view of FIG. 1, the longitudinal fiber-reinforced polymer strip 1 is crossed with one 2a of the lateral fiber-reinforced polymer strips 2 on the upper surface thereof to form a first contact point $C_1$, and crossed with another adjacent one 2b of the lateral fiber-reinforced polymer strips 2 on the lower surface thereof to form a second contact point $C_2$. If all of the longitudinal fiber-reinforced polymer strips 1 are crossed with the lateral fiber-reinforced polymer strips 2 so that the first and second contact points $C_1$ and $C_2$ are alternated in such a way, a so-called 'plain weave structure' geogrid in which the first and second contact points $C_1$ and $C_2$ are positioned in turns is made. According to experiments of the inventors, the geogrid shows the most optimized properties in the plain weave structure.

According to another embodiment of the present invention, the longitudinal fiber-reinforced polymer strips 1 may be crossed with the lateral fiber-reinforced polymer strips 2 so that at least two first contact points $C_1$ or at least two second contact points $C_2$ are continuously formed. This embodiment is well shown in FIGS. 10b and 10d. In the geogrid shown in FIGS. 10b and 10d, the longitudinal fiber-reinforced polymer strips 1 are crossed with the lateral fiber-reinforced polymer strips 2 so that two or three second contact points $C_2$ are continuously formed between the adjacent first contact points $C_1$.

The geogrid formed by crossing the longitudinal fiber-reinforced polymer strips 1 on or below the lateral fiber-reinforced polymer strips 2 shows increased resistance against vertical load and frictional force to reinforced materials such as soil, so shape stability and resistance to installation damage are greatly improved. A crossing angle between the longitudinal fiber-reinforced polymer strips and the lateral fiber-reinforced polymer strips is preferably in the range of 80° to 100°. If the crossing angle is smaller than 80° or larger than 100°, pullout force and capability of dispersion to a vertical load are seriously deteriorated, so the geogrid is likely not to be used as a reinforcing material for the civil engineering works. The crossing angle is most preferably 90°.

Figure 11A:
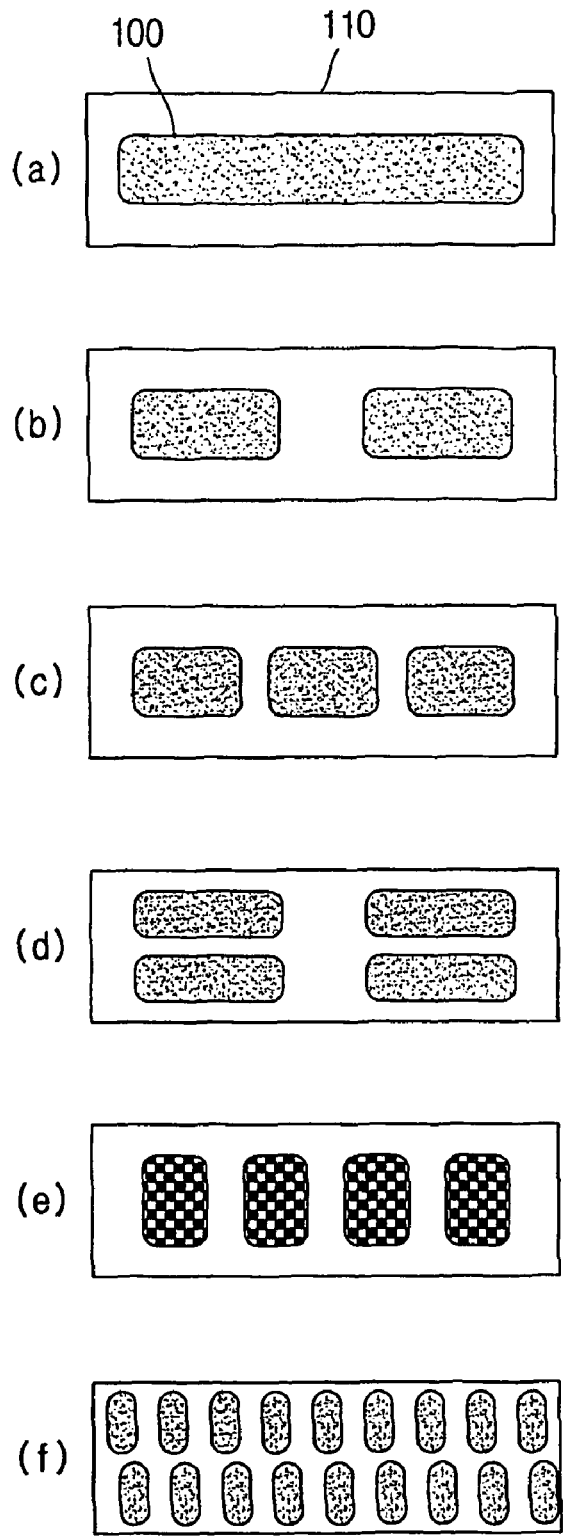
FIGS. 11a to 11c are sectional views showing various examples of the fiber-reinforced polymer strips.
Figure 11B:
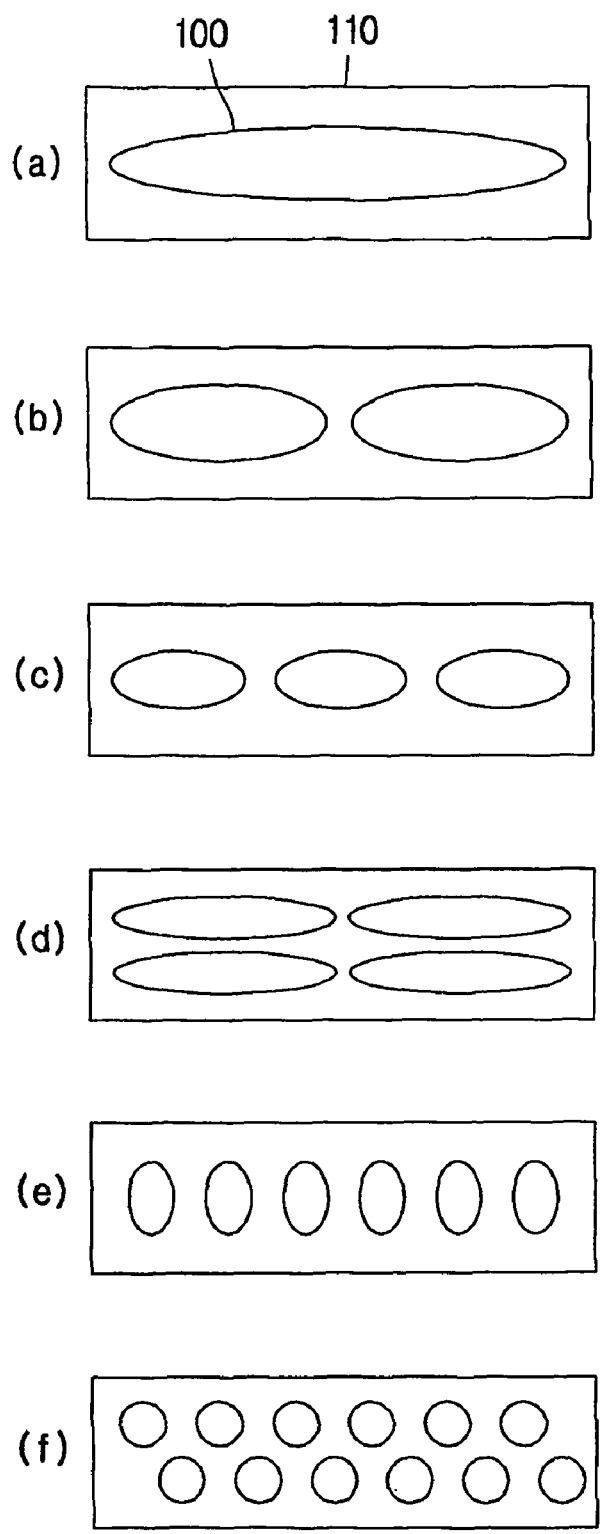
Figure 11C:
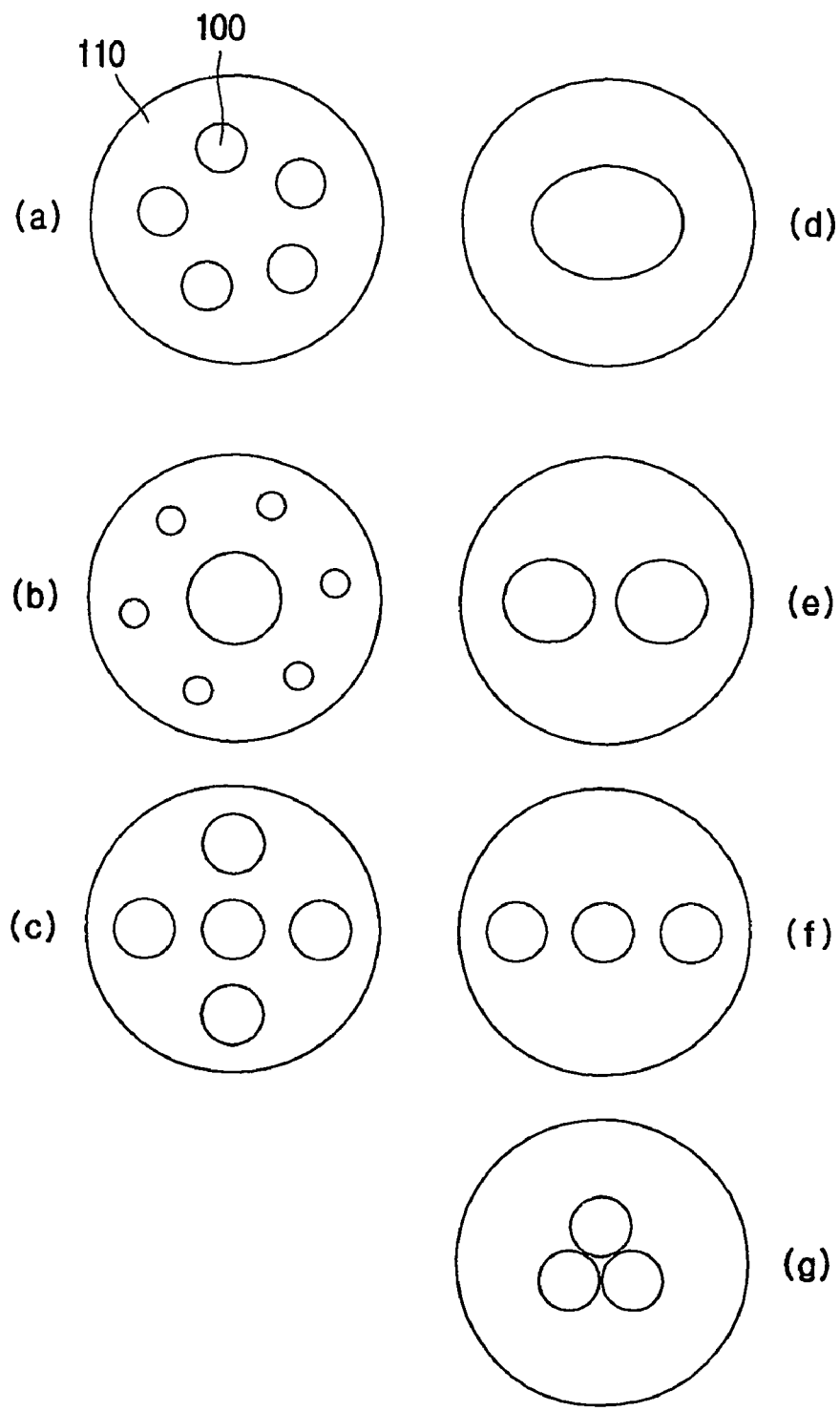

The longitudinal and lateral fiber-reinforced polymer strips 1 and 2 are respectively configured so that a reinforcing fiber is inserted into a thermoplastic polymer resin. FIGS. 11a to 11c show various kinds of cross sections of the fiber-reinforced polymer strips. Such various sections may be obtained by changing an aggregated or dispersed state of many fibers or changing a shape of a die used for extrusion of the thermoplastic polymer resin. For example, the fiber-reinforced polymer strips 1 and 2 may be configured so that a reinforcing fiber 100 in which many fibers are aggregated in a rectangular, oval or circular formation is reinforcing a thermoplastic polymer resin 110 extruded to have a rectangular section (see FIGS. 11a and 11b), or the fiber-reinforced polymer strips 1 and 2 may be configured so that a reinforcing fiber 100 in which many fibers are aggregated in a circular or oval formation is reinforcing a thermoplastic polymer resin 110 extruded to have a circular section (FIG. 11c). Besides them, the fiber-reinforced polymer strips may be made to have other sectional shapes as desired.

The geogrid using fiber-reinforced polymer strips which are respectively reinforced by fibers in a polymer resin shows high tensile strength, low tensile strain and low creep stain, and resistance to installation damage is also improved. Considering tensile strength, junction strength and manufacturing procedure of the geogrid, in case the fiber-reinforced polymer strip has a rectangular section, its width and thickness are preferably 2 to 30 mm and 1 to 10 mm, more preferably 3 to 20 mm and 1.5 to 5 mm respectively, while, in case the fiber-reinforced polymer strip has a circular section, its diameter is preferably 2 to 20 mm, more preferably 4 to 15 mm.

The thermoplastic polymer resin 110 used in the fiber-reinforced polymer strips 1 and 2 adopts a thermoplastic polymer resin capable of sufficiently protecting the reinforcing fiber 100 from outside and capable of mutual thermal welding. For example, polyolefin resin having a melt index (MI) of 1 to 35, polyethylene terephthalate having an intrinsic viscosity (IV) of 0.64 to 1.0, polyamide, polyacrylate, polyacrylonitrile, polycarbonate, polyvinylchloride, polystyrene, polybutadiene may be used alone or by mixing them. In addition, the reinforcing fiber 100 used in the fiber-reinforced polymer strips 1 and 2 may adopt all kinds of high strength fibers having high tensile strength, low tensile strain and low creep strain. For example, polyester fiber, glass fiber, aramid fiber, carbon fiber, basalt fiber, stainless steel fiber, copper fiber and amorphous metal fiber may be used alone or by twisting them. The entire cross section of the fiber in the longitudinal and lateral fiber-reinforced polymer strip is preferably 20 to 80% of the entire cross section of the fiber-reinforced polymer strip so that the reinforcing fiber is sufficiently protected by the thermoplastic polymer resin with giving satisfactory function. If the entire cross section of the reinforcing fiber is less than 20% of the entire cross section of the fiber-reinforced polymer strip, the reinforcing fiber may not give sufficient reinforcing function, while if the entire cross section of the reinforcing fiber exceeds 80% of the entire cross section of the fiber-reinforced polymer strip, the thickness of the polymer layer is too thin, thereby reducing an aggregating effect of the reinforcing fiber due to the polymer and deteriorating the resistance to installation damage since the reinforcing fiber is not sufficiently protected.

Referring to FIG. 1 again, thermoplastic polymer resins at the contact points $C_1$ and $C_2$ where the longitudinal fiber-reinforced polymer strip 1 and the lateral fiber-reinforced polymer strip 2 are crossed with each other are welded. Accordingly, the longitudinal fiber-reinforced polymer strip and the lateral fiber-reinforced polymer strip are fixed to each other, so the shape stability of the geogrid to a vertical load is kept to improve resistance to installation damage.

In the geogrid configured as described above, the plurality of longitudinal fiber-reinforced polymer strips are preferably respectively arranged in parallel at the intervals of 10 to 100 mm on the basis of the center line of the longitudinal fiber-reinforced polymer strips, more preferably at the intervals of 20 to 80 mm, while the plurality of lateral fiber-reinforced polymer strips are also preferably respectively arranged in parallel at the intervals of 10 to 100 mm on the basis of the center line of the lateral fiber-reinforced polymer strips, more preferably at the intervals of 20 to 80 mm.

When the intervals of the fiber-reinforced polymer strips are kept in the aforementioned range, the soil is not separated but integrated to give a satisfactory function as a reinforcing material. That is to say, if the interval between the fiber-reinforced polymer strips is too great, the load applied to the soil structure cannot be evenly dispersed to weaken the reinforcing function, while, if the interval between the fiber-reinforced polymer strips is too small, the upper and lower soil layers are apt to be easily separated, so the reinforcing function is not realized in its own way.

The geogrid according to the present invention is produced by making fiber-reinforced strips with the use of a fiber-reinforced strip making device at first, and then uses the made fiber-reinforced strips by means of a geogrid producing apparatus. Now, the method for producing the geogrid according to the present invention is described step by step.

Manufacture of Fiber-Reinforced Strip

Figure 3:
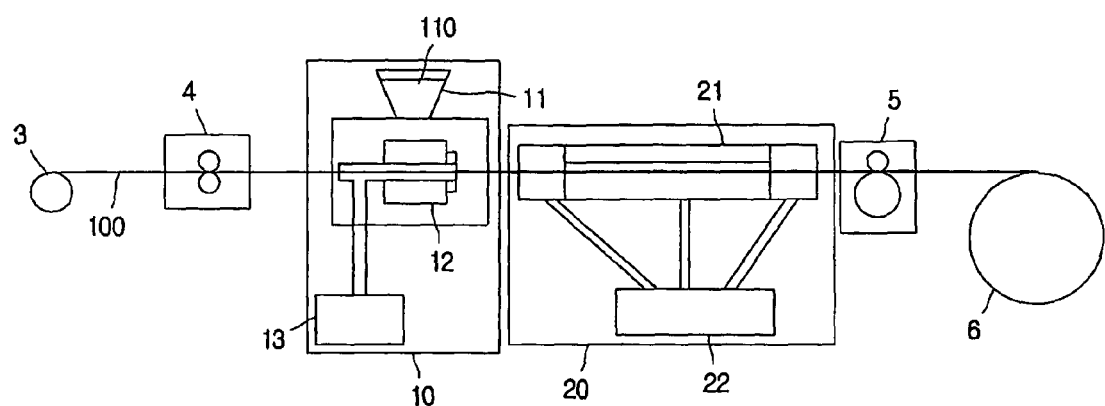
FIG. 3 is a schematic view showing an apparatus for making a fiber-reinforced polymer strip according to an embodiment of the present invention.

FIG. 3 is a schematic diagram showing the fiber-reinforced strip making device according to a preferred embodiment of the present invention. Referring to FIG. 3, the fiber-reinforced strip making device of this embodiment includes an extruder 10 for melt-extruding the polymer resin 110 supplied through a hopper 11 for burying the reinforcing fiber 100 therein, and a cooler 20 for cooling the extruded resin.

Figure 4:
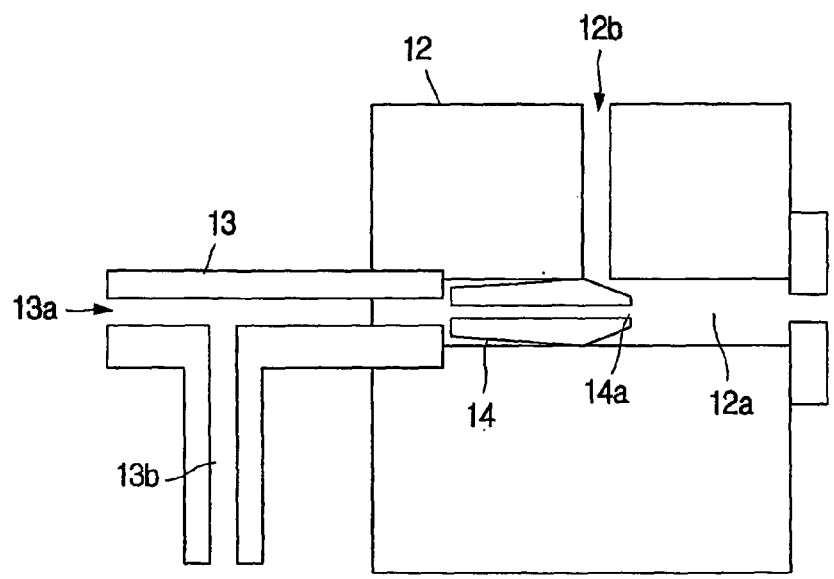
FIG. 4 is a schematic view showing a cross-head part of an extruder of the apparatus for making a fiber-reinforced polymer strip according to an embodiment of the present invention.

As shown in a detailed view of FIG. 4, the extruder 10 includes a crosshead die 12 for forming a fiber-reinforced polymer strip by supplying and coating the polymer resin 110 around the supplied reinforcing fiber 100, a guide holder 13 for giving a passage to supply the reinforcing fiber 100 to the crosshead die 12 and forming a vacuum to remove air from the fiber 100, and a nipple 14 for setting a position of the supplied reinforcing fiber 100 and preventing backward flowing of polymer melt.

An extrusion passage 12a is formed in the crosshead die 12 in a supply direction of the reinforcing fiber 100, and the extrusion passage 12a is communicated with a resin supply passage 12b for supplying the melt of the polymer resin 110 stored in the hopper 11.

The guide holder 13 has a fiber supply passage 13a for supplying the reinforcing fiber 100, and the guide holder 13 is combined to the crosshead die 12 so that the fiber supply passage 13a is connected to the extrusion passage 12a. In addition, a vacuum pipe 13b is combined to the fiber supply passage 13a in connection to a pump (13 of FIG. 3) in order to form a vacuum around the reinforcing fiber 100 supplied to the fiber supply passage 13a.

A nipple hole 14a is formed on the center of the nipple 14 in a longitudinal direction thereof, and the nipple 14 is installed so that the nipple hole 14a is connected to the fiber supply passage 13a. An end of the nipple 14 is extended near a position at which the resin supply passage 12b is connected in the extrusion passage 12a of the crosshead die 12. Thus, as described later, the reinforcing fiber 100 passing through the nipple hole 14a is surrounded and coated by the polymer resin 110 supplied in a melted state through the resin supply passage 12b.

The cooler 20 includes a constant temperature controller 22 for constantly keeping a temperature of a cooling tank 21 containing a coolant such as water and a temperature of the coolant. The strip extruded from the extruder 10 is cooled by the water with advancing along the cooling tank 21. At this time, the length of the cooling tank 21 may be suitably adjusted depending on the work.

In FIG. 3, reference numeral 3 denotes a creel on which the reinforcing fiber 100 is piled up, reference numeral 4 denotes a feeder for supplying the reinforcing fiber 100 at a constant speed to the extruder 10, reference numeral 5 is a pulling unit for pulling the extruded fiber-reinforced strip at a constant speed, and reference numeral 6 is a winder for winding the strip by a regular length.

The strip making device according to the present invention is operated as follows. At first, the reinforcing fiber 100 piled up on the creel 3 is supplied to the extruder 10 by the feeder 4. Preferably, the feeder 4 supplies the reinforcing fiber at a rate identical to the pulling speed of the strip due to the pulling unit 5 so that the reinforcing fiber 100 may keep a constant tension. This prevents the reinforcing fiber 100 from thermal shrinkage while passing through the crosshead die 12 so that the geogrid may give its own function as a reinforcing material for the civil engineering works.

The reinforcing fiber 100 supplied to the extruder 10 passes through the fiber supply passage 13a of the guide holder 13 and then advances into the nipple hole 14a of the nipple 14 connected thereto. Subsequently, the fiber 100 discharged through the nipple hole 14a passes through the extrusion passage 12a of the crosshead die 12.

At this time, the inside of the fiber supply passage 13a of the guide holder 13 is kept vacuum due to operation of the vacuum pump in the pump (13 of FIG. 3) in order to prevent bubbles from being captured when the reinforcing fiber brings in contact with the melted resin. If such bubbles are not removed, the bubbles are expanded in the extruded strip or burst on the surface, thereby causing inferior appearance and deteriorated properties of the strip. In addition, since expansion of the bubbles makes a polymer resin layer thinner at a corresponding region, the reinforcing fiber is apt to be easily damaged even by a light external impact during installation.

The reinforcing fiber 100 supplied through the nipple 14 is surrounded by the melted polymer resin supplied through the resin supply passage 12b and passes through the crosshead die 12. At this time, the nipple 14 prevents the polymer resin 110 from flowing backward toward the guide holder 13. In addition, if the sectional shape of the nipple hole 14a is changed variously, the reinforcing fiber may also obtain various shapes accordingly as shown in FIGS. 11a to 11c.

Moreover, the strip may also have diverse outer appearances by changing a sectional shape of the end of the extrusion passage 12a of the crosshead die 12.

The fiber-reinforced polymer strip passing through the crosshead die 12 is cooled in the cooling tank 21 of the cooler 20 by means of water. The cooled fiber-reinforced strip is wound around the winder 6 by a constant length through the pulling unit 5.

According to this embodiment, the fiber-reinforced polymer strip has a rectangular section with a width of 2 to 30 mm, preferably 3 to 20 mm, and a thickness of 1 to 10 mm, preferably 1.5 to 5 mm, or has a circular section with a diameter of 2 to 20 mm, preferably 4 to 15 mm. If the width or diameter of the strip is less than 2 mm, it is difficult to make a product having a minimum tensile strength 2 ton/m (20 kN/m). On the while, if the strip has a width more than 30 mm or a diameter larger than 20 mm, it is hard to arrange the product on a strip arranging device described later or wind the product around a roll by a constant length.

Manufacture of Geogrid

Now, a process of making a geogrid using the made fiber-reinforced polymer strips according to the present invention is described. According to the following method, it is possible to mass-produce the geogrid at a low cost.

According to the present invention, the fiber-reinforced polymer strips 1 and 2 are arranged longitudinally and laterally respectively. Arrangement of the strips may be changed to diversify the lattice structure so that the reinforcing characteristic of the product may be better realized.

Figure 5A:
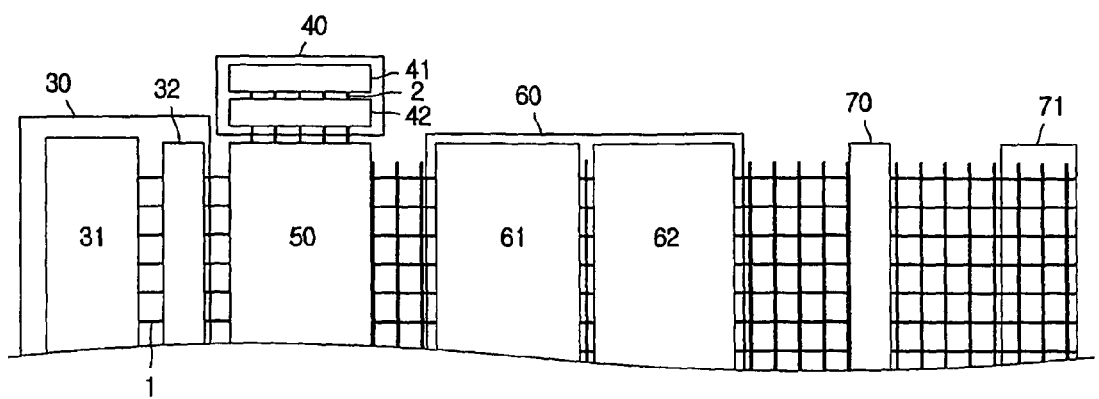
FIGS. 5a and 5b are plane view and side view schematically showing an apparatus for producing a geogrid according to an embodiment of the present invention, respectively.
Figure 5B:
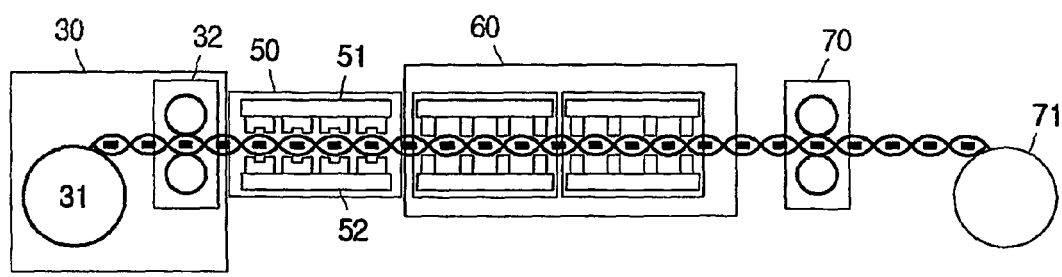

FIGS. 5a and 5b schematically show the geogrid producing apparatus according to a preferred embodiment of the present invention. Referring to FIGS. 5a and 5b, the geogrid producing apparatus includes a longitudinal strip supply unit 30, a lateral strip supply unit 40, a strip arranging unit 50, a welding unit 60, a pulling unit 70, and a winder 71.

The longitudinal strip supply unit 30 includes a longitudinal creel 31, and a longitudinal feeder 32 for supplying a strip from the creel 31 to the strip arranging unit 50. For example, the feeder 32 is composed of a pair of rollers so that a polymer strip is engaged and supplied between the rollers. The longitudinal fiber-reinforced polymer strip 1 is mounted to the longitudinal creel 31, and a plurality of longitudinal fiber-reinforced polymer strips 1 are supplied in a row to the strip arranging unit 50 by means of operation of the longitudinal feeder 32.

Figure 6:
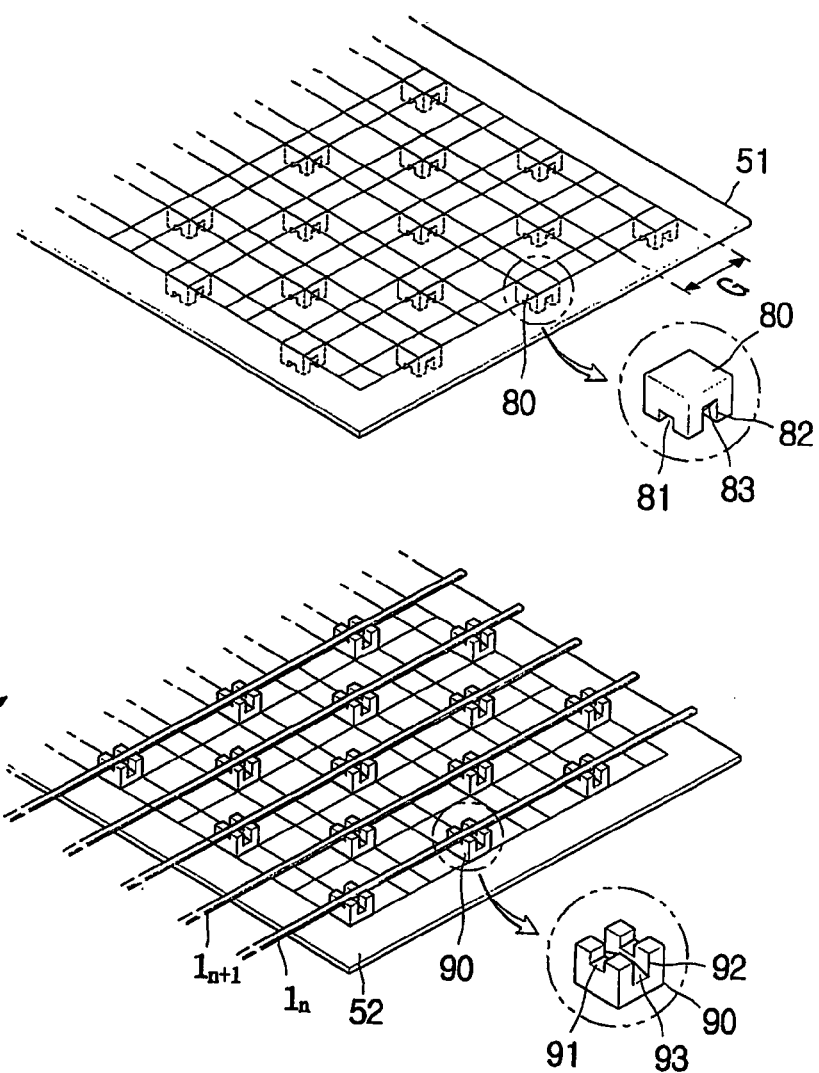
FIG. 6 is a perspective view schematically showing a strip arranging unit in the geogrid producing apparatus according to an embodiment of the present invention.

The strip arranging unit 50 acts for weaving a geogrid by crossing the longitudinal and lateral strips 1 and 2 in turns. As shown in FIG. 6, the strip arranging unit 50 includes a pair of upper and lower plates 51 and 52 which are opposed to each other. At least one of the upper and lower plates 51 and 52 is moved vertically by means of a driving means (not shown).

On the opposite surfaces of the upper and lower plates 51 and 52, a first bending member 80 and a second bending member 90 are respectively provided for pressing and bending the supplied longitudinal fiber-reinforced polymer strip 1, for example. Virtual lattices are marked on the upper and lower plates 51 and 52 shown in FIG. 6, and a gap (G) of the lattice is identical to a lattice scale of the geogrid to be produced. As described later, each cross point of the lattice is corresponding to a cross point of the geogrid.

The bending members 80 and 90 are installed at cross points of the virtual lattice. At this time, the first and second bending members 80 and 90 are alternatively arranged so that the first and second bending members 80 and 90 are not directly faced with each other. Positions of the bending members are determined according to location and number of first contact points $C_1$ and second contact points $C_2$ of the geogrid to be produced. In this embodiment since the longitudinal and lateral fiber-reinforced polymer strips 1 and 2 have a so-called 'plain weave' structure in which the longitudinal and lateral fiber-reinforced polymer strips 1 and 2 are regularly alternated up and down, so first and second bending members 80 and 90 are also arranged regularly every other points.

The first bending member 80 has a first pair of longitudinal support grooves 81 and a first pair of lateral support grooves 82. The second bending member 90 has a second pair of longitudinal support grooves 91 and a second pair of lateral support grooves 92. The longitudinal support grooves 81 and 91 are contacted with the longitudinal fiber-reinforced polymer strips 1 so that the longitudinal fiber-reinforced polymer strips 1 are not deviated when being pressed. The longitudinal support grooves 81 and 91 are larger than the width of the polymer strip 1.

The lateral support grooves 82 and 92 provide a passage for the lateral fiber-reinforced polymer strip 2 when the lateral fiber-reinforced polymer strip 2 is inserted into a closed space formed by the ridge and valley of the longitudinal fiber-reinforced polymer strips 1 bent by the first and second bending members 80 and 90. Thus, the size of the lateral support grooves 82 and 92 is also larger than the width of the lateral fiber-reinforced polymer strip 2.

The lateral support grooves 82 and 92 have depth larger than the longitudinal support grooves 81 and 91 so that the lateral fiber-reinforced polymer strip 2 may be easily passed through them. Preferably, slopes 83 and 93 are respectively formed on the lateral support grooves 82 and 92 so as to guide an end of the lateral fiber-reinforced polymer strip 2 to be inserted.

The lateral strip supply unit 40 includes a lateral creel 41, and a lateral feeder 42 for supplying a strip from the creel 41 to the strip arranging unit 50. The creel 41 and the feeder 42 are configured identically to those of the longitudinal strip supply unit 30.

The welding unit 60 acts for mutually adhering the longitudinal and lateral strips arranged by the strip arranging unit 50 at their contact points. Preferably, the welding unit 60 has first and second welders 61 and 62. According to this embodiment, the strips are mutually adhered by vibration so as to give their junction strength to the maximum without damaging the reinforcing fiber existing in the polymer resin.

Figure 7A:
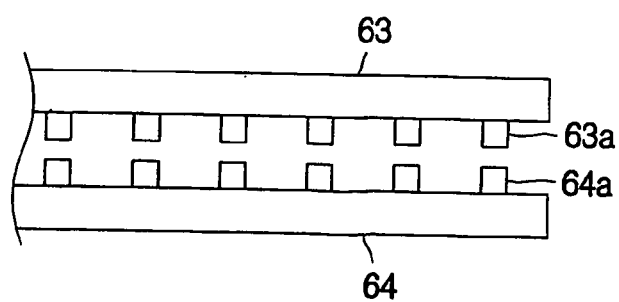

FIG. 7a shows the first welder 61. As shown in FIG. 7a, the welder 61 has an upper jig 63 and a lower jig 64, which are faced with each other and through which an array of the longitudinal and lateral fiber-reinforced polymer strips 1 and 2 is supplied. Plural pairs of first opposite support holders 63a and 64a are formed on opposite surfaces of the upper and lower jigs 63 and 64.

Figure 7B:
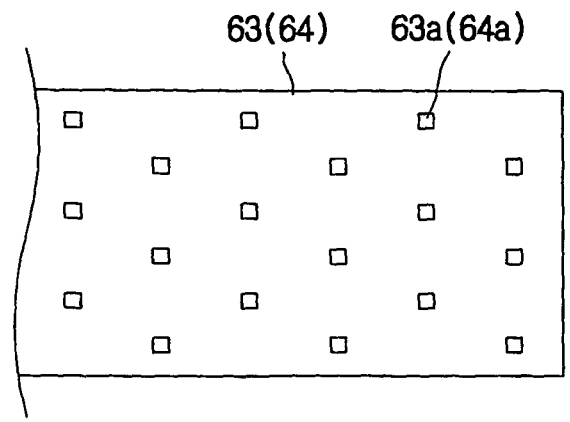
Figure 7C:
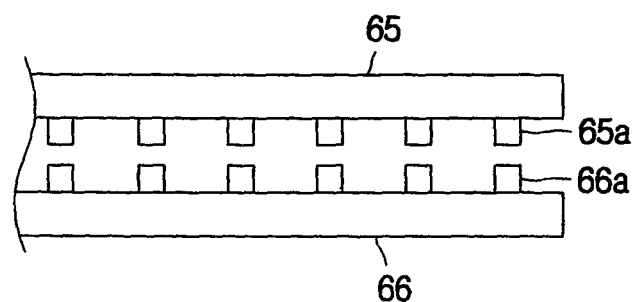

Similarly, the second welder 62 also has upper and lower jigs 65 and 66 as shown in FIG. 7c, and also has a plurality of second support holders 65a and 66a protruded on opposite surfaces of the tipper and lower jigs 65 and 66 so as to be faced with each other.

Figure 7D:
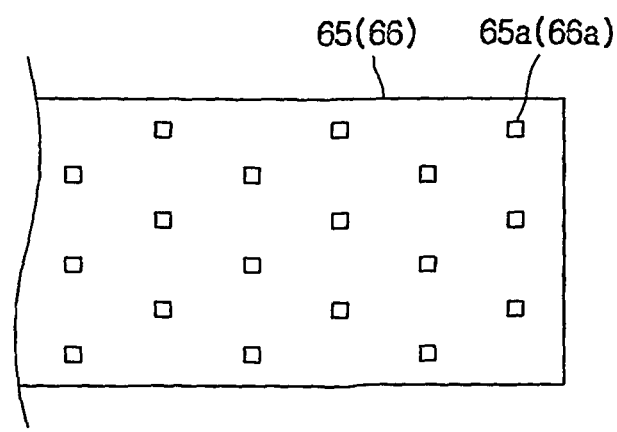

According to this embodiment, locations of the first support holders 63a and 64a and the second support holders 65a and 66a are corresponding to contact points of the longitudinal and lateral fiber-reinforced polymer strips 1 and 2 arranged by the strip arranging unit 50. For example, as shown in FIGS. 7b and 7d respectively, the first support holders 63a and 64a mutually adhere the longitudinal and lateral fiber-reinforced polymer strips 1 and 2 at the first contact points $C_1$ (see FIG. 1), while the second support holders 65a and 66a mutually adhere the longitudinal and lateral fiber-reinforced polymer strips 1 and 2 at the second contact points $C_2$.

The support holders preferably have rough surface of ends so that the polymer strip contacted with the support holders is not slid. An surface shape of the support holder is not limited to this embodiment, but may be modified variously so long as it may press and support the polymer strip.

The welder melts the polymer resins 110 surrounding the reinforcing fiber 100 at a short time by means of relative vibrations between the upper and lower jigs so that the polymer resins 110 are adhered. For example, if the lower jig 64 is fixed and the upper jig 63 is vibrated in a direction perpendicular to the longitudinal direction while the first support holders 63a and 64a of the first welder 61 support the polymer strip array at the first contact point $C_1$ by pressing the upper surface of the longitudinal polymer strip 1 and the lower surface of the lateral polymer strip 2 respectively, the polymer resin at the first contact point $C_1$ is melt and then adhered.

Similarly, if the upper jig 65 is fixed and the lower jig 66 is vibrated in a direction perpendicular to the longitudinal direction while the second support holders 65a and 66a of the second welder 62 support the polymer strip array at the second contact point $C_2$ by pressing the upper surface of the lateral polymer strip 2 and the lower surface of the longitudinal polymer strip 1 respectively, the polymer resin at the second contact point $C_2$ is melt and then adhered.

Though the welding unit 60 is illustrated with reference to the drawings in this embodiment, the present invention is not limited to that case, but any means capable of causing relative vibrations between the longitudinal and lateral polymer strips crossed with each other so that the longitudinal and lateral polymer strips are melt and adhered will be considered within the scope of the present invention.

Now, a method for producing a geogrid with the use of the geogrid producing apparatus constructed as above according to the present invention is described with reference to FIG. 9.

First, the fiber-reinforced polymer strips made by the aforementioned strip making process are mounted on the longitudinal creel 31 of the longitudinal strip supply unit 30 and the lateral creel 41 of the lateral strip supply unit 40, respectively in parallel (step S300).

At this time, the fiber-reinforced polymer strips 1 and 2 mounted on the creels 31 and 41 are respectively spaced as much as 10 to 100 mm on the basis of their center line, preferably 20 to 80 mm. For example, if it is desired to make the geogrid having a width of 1 to 5 m, the number of strips to be supplied is 10 to 500. If the space between the strips is too large more than 100 mm, the geogrid reinforcement cannot disperse an applied load uniformly, thereby lessening its reinforcing function. On the while, if the space between the strips is too small less than 10 mm, the soil is apt to be separated into upper and lower layers, thereby not realizing reinforcing function of the geogrid reinforcement in its own way. However, if the space between the polymer strips is kept in the aforementioned range, the soil is not separated but integrated and the geogrid may function as a reinforcing material.

Subsequently, the longitudinal fiber-reinforced polymer strips 1 are supplied in a row from the longitudinal creel 31 into the strip arranging unit 50 by means of the longitudinal feeder 32 (step S310). At this time, the upper and lower plates 51 and 52 of the strip arranging unit 50 are spaced apart from each other, and thus the longitudinal fiber-reinforced polymer strips 1 advance along a line connecting the longitudinal support grooves 81 and 91 of the first and second bending members 80 and 90. Preferably, if the longitudinal fiber-reinforced polymer strips 1 are completely supplied, the longitudinal fiber-reinforced polymer strips 1 are cut into a suitable length by means of a cutting means (not shown).

Figure 8A:
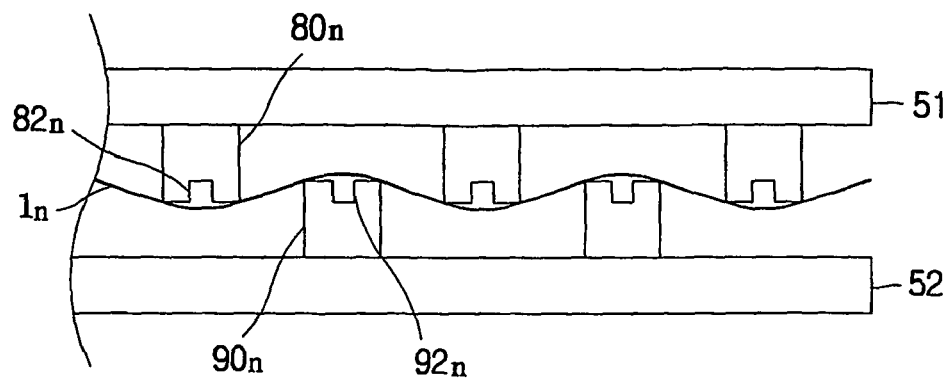
FIGS. 8a to 8c are schematic side views for illustrating the process of bending a fiber-reinforced polymer strip in the strip arranging unit according to an embodiment of the present invention.
Figure 8B:
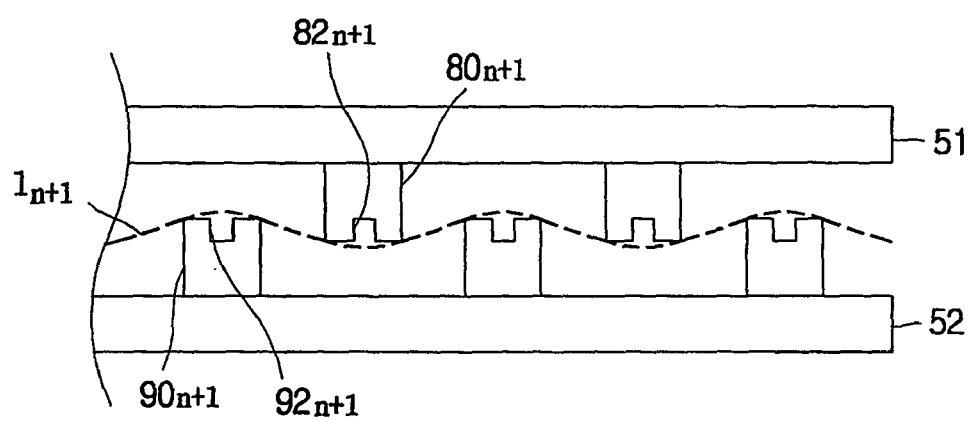

Then, the longitudinal fiber-reinforced polymer strips 1 are pressed and bent (step S320). FIGS. 8a and 8b show a bending state of a $n^{th}$ longitudinal fiber-reinforced polymer strip $1_n$ (see FIG. 6, drawn by a solid line) and a $n+1^{th}$ longitudinal fiber-reinforced polymer strip $1_{n+1}$ (drawn by a dotted line).

Referring to FIG. 8a, if the upper and lower plates 51 and 52 approach each other to press the $n^{th}$ longitudinal fiber-reinforced polymer strip $1_n$, the ends of the first and second bending members $80_n$ and $90_n$ come in contact with the longitudinal polymer strip $1_n$ and press the strip $1_n$. At this time, the first and second bending members $80_n$ and $90_n$ preferably have the longitudinal support groove 81 and 91 (see FIG. 6). Thus, the strip is seated in the support grooves when being pressed, so the polymer strip may be stably bent without departing from its position. According to this bending procedure, a valley is formed in the polymer strip at a position pressed by the first bending member $80_n$, while a ridge is formed in the polymer strip at a position pressed by the second bending member $90_n$.

On the while, if a longitudinal polymer strip $1_{n+1}$ at a $n+1^{th}$ position is pressed, ridge and valley are formed in the longitudinal polymer strip $1_{n+1}$ contrary to the $n^{th}$ longitudinal polymer strip $1_n$ as shown in FIG. 8b since $n+1^{th}$ first and second bending members $80_{n+1}$ and $90_{n+1}$ are alternatively arranged up and down in turns with the $n^{th}$ first and second bending members $80_n$ and $90_n$. That is to say, a valley is formed in the polymer strip at a position pressed by the first bending member $80_{n+1}$, while a ridge is formed in the polymer strip at a position pressed by the second bending member $90_{n+1}$.

Figure 8C:
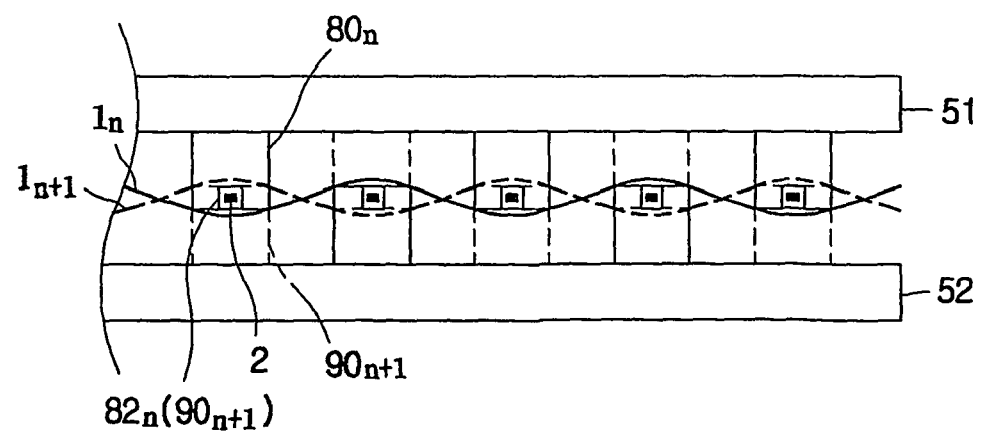

In fact, since the upper and lower plates 51 and 52 press the polymer strip at the same time, the polymer strips are bent so that ridges and valleys are oppositely crossed as shown in FIG. 8c.

With the longitudinal fiber-reinforced polymer strips 1 being bent as mentioned above, the lateral fiber-reinforced polymer strips 2 are supplied by means of the lateral strip supply unit 40 (step S330). Specifically, the lateral fiber-reinforced polymer strips 2 are inserted into the lateral support grooves 82 and 92 of the first and second bending members 80 and 90 by means of the lateral feeder 42 as shown in FIG. 8c.

In other words, the lateral polymer strip 2 is inserted into a space between the valley of the $n^{th}$ polymer strip $1_n$ formed by the $n^{th}$ first bending member $80_n$ and the ridge of the $n+1^{th}$ polymer strip $1_{n+1}$ formed by the $n+1^{th}$ second bending member $90_{n+1}$. Or else, the lateral polymer strip 2 is inserted into a space between the ridge of the $n^{th}$ polymer strip $1_n$ formed by the $n^{th}$ second bending member $90_n$ and the valley of the $n+1^{th}$ polymer strip $1_{n+1}$ formed by the $n+1^{th}$ first bending member $80_{n+1}$. Though it is described in this embodiment that the lateral fiber-reinforced polymer strip 2 is inserted by means of the lateral strip supply unit 40 prepared at one side of the strip arranging unit 50, the lateral strip supply unit 40 may be prepared at both sides of the strip arranging unit 50 so as to supply lateral strips from both sides of the strip arranging unit 50 at once.

If the upper and lower plates 51 and 52 move away with the lateral polymer strip 2 being inserted and cut into a suitable length, the longitudinal and lateral polymer strips 1 and 2 are 'woven' so that the longitudinal and lateral polymer strips 1 and 2 are alternatively crossed up and down as shown in FIG. 1. At this time, a ridge of the longitudinal polymer strip 1 is crossed with the lateral polymer strip 2 to form a first contact point $C_1$, while a valley of the longitudinal polymer strip 1 is crossed with the lateral polymer strip 2 to form a second contact point $C_2$.

According to the present invention, it is possible to produce a geogrid with various woven structures by changing positions of the bending members 80 and 90 of the upper and lower plates 51 and 52. FIGS. 10a to 10d show examples of such a geogrid.

As shown in FIG. 10a, if two first bending members 80' are successively positioned between the second bending members 90' along the longitudinal direction on the opposite surfaces of the upper and lower plates 51' and 52', the longitudinal and lateral polymer strips are arranged so that two second contact points $C_2$ are positioned between the first contact points $C_1$ as shown in FIG. 10b. In other words, in this case, it may be understood that two lateral polymer strips are inserted into one valley (or, one ridge) of the longitudinal polymer strip.

Figure 10C:
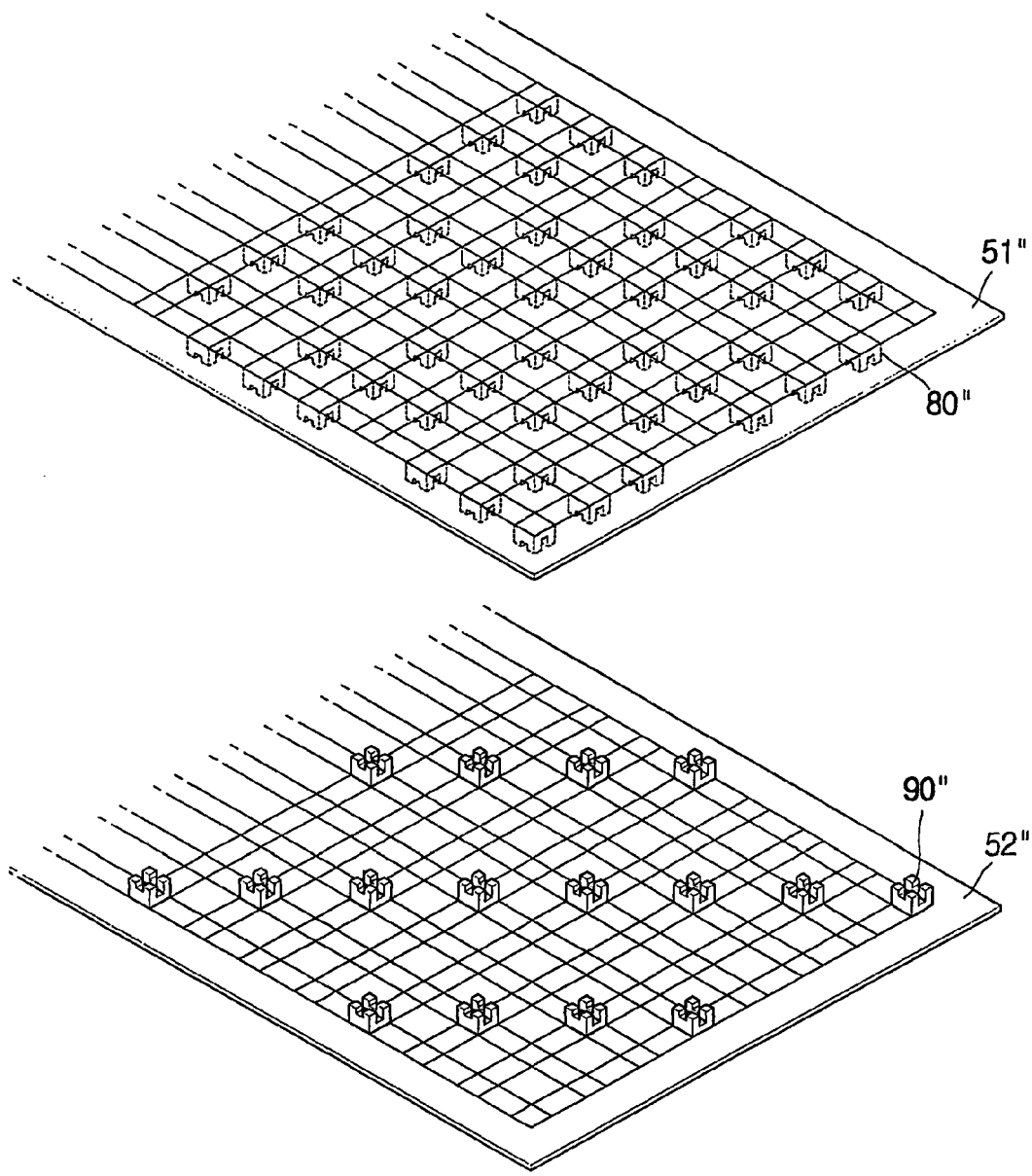
Figure 10D:
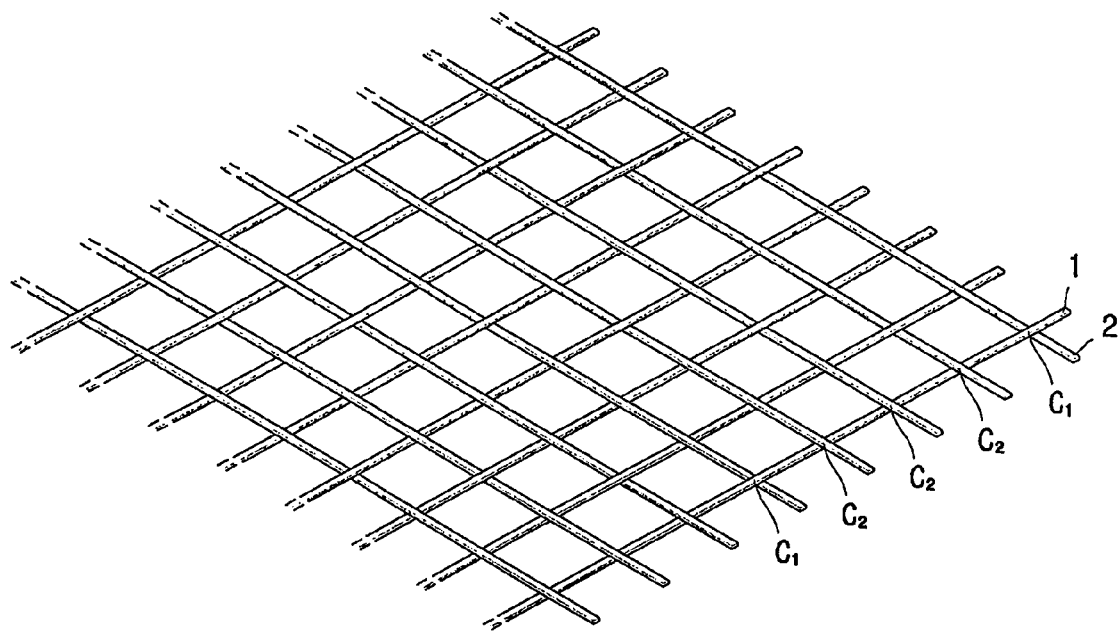

In addition, if three first bending members 80" are successively positioned between the second bending members 90" on the opposite surfaces of the upper and lower plates 51" and 52" as shown in FIG. 10c, one longitudinal polymer strip 1 has three second contact points $C_2$ between the first contact points $C_1$ as shown in FIG. 10d. That is to say, this may be understood that three lateral polymer strips are inserted into one valley (or, one ridge) of the longitudinal polymer strip.

Though it is described in this embodiment regarding a $n^{th}$ longitudinal polymer strip and an adjacent $n+1^{th}$ longitudinal polymer strip, the same principle may be applied to other longitudinal polymer strips which are not adjacent to each other.

The longitudinal and lateral polymer strips 1 and 2 arranged as mentioned above are then transferred to the welding unit 60 so that the contact points $C_1$ and $C_2$ are welded. First, the upper and lower jigs 63 and 64 shown in FIG. 7a approaches each other at the first welder 61a to press the polymer strip array interposed between the jigs 63 and 64. At this time, the first holders 63a and 64a formed on the opposite surfaces of the upper and lower jigs 63 and 64 press and support the first contact points $C_1$ of the polymer strip array. More specifically, the support 63a of the upper jig 63 is contacted with the upper surface of the longitudinal polymer strip 1, while the support holder 64a of the lower jig 64 is contacted with the lower surface of the lateral polymer strip 2. At this time, the ends of the support holders 63a and 64a have rough surfaces so as to be contacted with the surfaces of the polymer strip without sliding.

In this state, if the upper jig 63 is vibrated in a direction perpendicular to the length of the longitudinal polymer strip 1, for example right and left directions, with the lower jig 64 being fixed, the polymer resin 110 of the strip is melt and the first contact points $C_1$ become adhered (step S340). At this time, the vibration preferably has the frequency of 60 to 300 Hz and the amplitude of 0.3 to 1.8 mm so that the polymer resin is melt for a short time without damaging the reinforcing fiber 100 in the polymer resin.

If the first contact points $C_1$ are adhered as mentioned above, the longitudinal and lateral polymer strip array is transferred again to the second welder 62 for vibration welding of the second contact points $C_2$ (step S350).

In the second welder 62, the second support holders 65a and 66a of the upper and lower jigs 65 and 66 are contacted with the second contact points $C_2$ of the longitudinal and lateral polymer strip array. At this time, in this embodiment, the support holder 65a is contacted with the upper surface of the lateral polymer strip 2, while the support holder 66a is contacted with the lower surface of the longitudinal polymer strip 1.

In this state, the upper jig 65 is fixed and the lower jig 66 is vibrated in a direction perpendicular to the length of the longitudinal strip 1, for example right and left directions, so as to perform the adhesion in the same way as the former procedure.

Though it is illustrated in the description and drawings that the first contact points $C_1$ and the second contact points $C_2$ are separately vibration-welded, it should be understood that the present invention is not limited to that case but various modifications may be applied thereto. For example, the first contact points $C_1$ and the second contact points $C_2$ may be adhered using only one welder. In this case, the first contact points $C_1$ is firstly adhered and then the strip array is wound around the winder, and then the strip array is again released into the welder. At this time, if the array is turned over for inversion of the upper and lower surfaces, the second contact points $C_2$ may be adhered. Furthermore, the contact points of the polymer strip may be adhered using the ultrasonic frictional welding or the heating, or hot-melt instead of the vibration welding.

After completing the adhesion, the geogrid is wound around the winder 71 by a regular length through the pulling unit 70. Preferably, the fiber-reinforced geogrid product has a length of 25 to 200 m for the convenience of treatment on the working spot Though the making process of the fiber-reinforced polymer strip and the producing process of the geogrid are separately described in this embodiment, these processes may be performed successively.

Hereinafter preferred embodiments of the present invention will be described in detail. Prior to the description, it should be understood that the embodiments according to the present invention may be changed in various ways, and the present invention should not be interpreted to be limited to the following embodiments. The embodiments of the present invention are intended just for giving better perfect explanation to those ordinary skilled in the art.

The properties of the geogrid according to the embodiments are measured using the following tests.

Wide-Width Tensile Strength Test: ASTM D 4595

A sample having a width of 20 cm is fixed between clamps attached on and below the transformation-controlling tensile strength tester and then tensioned at a rate of 10±3%/min, and then tensile strength and tensile elongation are measured at the breaking point due to tensile transformation. In case a glass fiber is used as a reinforcing fiber, the tensile strength (LASE 2%) when the tensile strain is 2% is separately recorded, while, in case a polyester high-strength fiber is used as a reinforcing fiber, the tensile strength (LASE 5%) when the tensile strain is 5% is separately recorded.

Creep Test ASTM D 5262

The creep test evaluates deformation behavior of the geogrid when a constant tensile load is applied continuously at a constant temperature condition of 21±2° C. so as to determine a tensile strength reduction factor due to the creep, which is considered in design. In this experiment, 45% load of the maximum tensile strength of the geogrid sample is applied to the sample, and the creep strain is measured after 1,000 hours.

Assessment of Installation Damage: ASTM D 5818

A base subgrade is treated in the same way as the actual structure building, then a geogrid sample of at least 10 m² is installed, a fill material is installed thereon, and then they are compacted in the same way as the actual structure building. As for the fill material, aggregate having a size of at most 20 mm is compacted in a thickness of 30 cm, and then the geogrid sample is installed and the same fill material is installed again thereon in a thickness of 30 cm, and then a vibration roller of 10 ton capacity is used for four time reciprocating compaction.

After the compaction, the compacted aggregation is removed not to damage the geogrid so that the geogrid sample is exhumed, and then a tensile strength is tested for the exhumed sample to calculate a strength reduction rate in comparison to the tensile strength of the original sample.

Test for Shape Stability

Installation and compaction are conducted in the same way as the assessment of installation damage, and then contact points of the longitudinal and lateral strips are observed. If the number of separated contact points is more than 20%, it is evaluated as "inferior", if the number of separated contact points is in the range of 10 to 20%, it is evaluated as "normal", while the number of separated contact points is less than 10%, it is evaluated as "superior".

Evaluation of Pullout Test

Soil is filled in a soil box having a length of 140 cm, a width of 60 cm, and a height of 60 cm, and the geogrid is installed in the soil. At this time, the geogrid sample is connected to a drawing device through a slit of 2.5 cm. In addition, a rubber membrane is mounted to the upper portion of the soil box so as to apply a uniform vertical load to the soil box by means of air pressure. Then, with changing the vertical load from 0.3 to 1.2 kg/cm² (3 to 12 kN/cm²), an interaction coefficient $C_i$ showing a frictional force between the geogrid and the soil is evaluated by analyzing the pullout displacement of the geogrid at the maximum pullout force, with a pullout displacement rate of 0.1 cm/mim.

Embodiment 1

A polyester high-tenacity fiber bundle of 48000 deniers is passed through a nipple having a rectangular section and through a rectangular die to make a longitudinal fiber-reinforced polymer strip having a section shown in (a) of FIG. 11a with a width of 8.4 mm and a thickness of 2.3 mm. In addition, a lateral fiber-reinforced polymer strip having the same section as the longitudinal fiber-reinforced polymer strip with a width of 6.3 mm and a thickness of 1.5 mm is made with the use of polyester high-tenacity fiber bundle of 20000 deniers. Polypropylene having a melt index of 4 is used as a thermoplastic polymer resin. Then, the longitudinal fiber-reinforced polymer strips are arranged on the strip arranging unit so that a product width is 4 m and a distance between the strips is 40 mm, and then the lateral fiber-reinforced polymer strips are inserted at an interval of 50 mm to have an angle of 90° with the longitudinal strip, thereby making a lattice having a plain weave structure as shown in FIG. 1. Subsequently, the first welder welds contact points at which the longitudinal strip is positioned above the lateral strip, by vibrations having a frequency of 194 Hz and an amplitude of 0.5 mm. And then, the lattice is moved to the second welder so as to weld contact points at which the longitudinal strip is positioned below the lateral strip, by vibration having a frequency of 194 Hz and an amplitude of 0.5 mm, thereby making a geogrid. The number of ribs per unit length (ribs/m), a wide-width tensile strength (kN/m), LASE5% (kN/m), a tensile strain (%), a creep strain (%) and a strength reduction rate (%) under construction of the produced geogrid are shown in the following table 1, and an interactive coefficient in pullout and shape stability are shown in the following table 4.

Embodiment 2

Two polyester high-tenacity fiber bundles of 24000 deniers are passed through a two-hole nipple having a rectangular section and through a rectangular die to make a longitudinal fiber-reinforced polymer strip having a section shown in (b) of FIG. 11a with a width of 8.4 mm and a thickness of 2.3 mm. In addition, a lateral fiber-reinforced polymer strip having the same section as the longitudinal fiber-reinforced polymer strip with a width of 6.3 mm and a thickness of 1.5 mm is made with the use of two polyester high-tenacity fiber bundles of 10000 deniers. Then, the strips are arranged in the same way as the first embodiment to produce a geogrid. The number of ribs per unit length (ribs/m), a wide-width tensile strength (kN/m), LASE5% (kN/m). a tensile strain (%), a creep strain (%) and a strength reduction rate (%) under construction of the produced geogrid are shown in the following table 1.

Embodiment 3

Three polyester high-tenacity fiber bundles of 16000 deniers are passed through a three-hole nipple having a rectangular section and through a rectangular die to make a longitudinal fiber-reinforced polymer strip having a section shown in (c) of FIG. 11a with a width of 8.4 mm and a thickness of 2.3 mm. In addition, a lateral fiber-reinforced polymer strip having the same section as the longitudinal fiber-reinforced polymer strip with a width of 6.3 mm and a thickness of 1.5 mm is made with the use of four polyester high-tenacity fiber bundles of 5000 deniers. Then, the strips are arranged in the same way as the first embodiment to produce a geogrid. The number of ribs per unit length (ribs/m), a wide-width tensile strength (kN/m), LASE5% (kN/m), a tensile strain (%), a creep strain (%) and a strength reduction rate (%) under construction of the produced geogrid are shown in the following table 1.

Embodiment 4

Eight polyester high-tenacity fiber bundles of 3000 deniers are passed through a four-hole nipple having a rectangular section and through a rectangular die to make a longitudinal fiber-reinforced polymer strip having a section shown in (e) of FIG. 11a with a width of 6.3 mm and a thickness of 1.5 mm. In addition, a lateral fiber-reinforced polymer strip having the same section as the longitudinal fiber-reinforced polymer strip with a width of 6.3 mm and a thickness of 1.5 mm is made with the use of four polyester high-tenacity fiber bundles of 5000 deniers. Then, the strips are arranged in the same way as the first embodiment to produce a geogrid. The number of ribs per unit length (ribs/m), a wide-width tensile strength (kN/m), LASE5% (kN/m), a tensile strain (%), a creep strain (%) and a strength reduction rate (%) under construction of the produced geogrid are shown in the following table 1.

Embodiment 5

Twelve polyester high-tenacity fiber bundles of 3000 deniers are passed through a four-hole nipple having a rectangular section and through a rectangular die to make a longitudinal fiber-reinforced polymer strip having a section shown in (e) of FIG. 11a with a width of 6.8 mm and a thickness of 2.0 mm. In addition, a lateral fiber-reinforced polymer strip having the same section as the longitudinal fiber-reinforced polymer strip with a width of 6.3 mm and a thickness of 1.5 mm is made with the use of four polyester high-tenacity fiber bundles of 5000 deniers. Then, the strips are arranged in the same way as the first embodiment to produce a geogrid. The number of ribs per unit length (ribs/m), a wide-width tensile strength (kN/m), LASE5% (kN/m), a tensile strain (%), a creep strain (%) and a strength reduction rate (%) under construction of the produced geogrid are shown in the following table 1.

Embodiment 6

Two polyester high-tenacity fiber bundles of 40000 deniers are passed through a two-hole nipple having a rectangular section and through a rectangular die to make a longitudinal fiber-reinforced polymer strip having a section shown in (b) of FIG. 11a with a width of 11.5 mm and a thickness of 2.5 mm. At this time, polypropylene having a melt index of 4 is used as a thermoplastic polymer resin. A lateral fiber-reinforced polymer strip having a section shown in (c) of FIG. 11a with a width of 6.3 mm and a thickness of 1.5 mm is made with the use of three polyester high-tenacity fiber bundles of 7000 deniers and a three-hole nipple having a rectangular section. A position of the bending members 80' and 90' of the strip arranging unit is changed as shown in FIG. 10a, the made longitudinal strips are arranged on the strip arranging unit at intervals of 40 mm, and then the lateral fiber-reinforced strips are inserted at intervals of 50 mm to have an angle of 90° with the longitudinal strip, thereby making a lattice having a modified strip array as shown in FIG. 10b. Subsequently, contact points formed in the strip array are adhered with the use of a vibration welding device giving a frequency of 194 Hz and an amplitude of 0.5 mm to produce a geogrid.

The number of ribs per unit length (ribs/m), a wide-width tensile strength (kN/m), LASE5% (kN/m), a tensile strain (%), a creep strain (%) and a strength reduction rate (%) under construction of the produced geogrid are shown in the following table 1.

Embodiment 7

A geogrid is produced in the same way as the sixth embodiment except that a position of the bending members 80' and 90' is changed as shown in FIG. 10c.

The number of ribs per unit length (ribs/m), a wide-width tensile strength (kN/m), LASE5% (kN/m), a tensile strain (%), a creep strain (%) and a strength reduction rate (%) under construction of the produced geogrid are shown in the following table 1.

TABLE 1

| | Longitudinal strip | | | | | | Lateral strip | | |
|---|---|---|---|---|---|---|---|---|---|
| | No. of ribs (ribs/m) | Tensile strength (kN/m) | LASE5% (kN/m) | Tensile strain (%) | Strength reduction rate (%) | Creep strain (%) | No. of ribs (ribs/m) | Wide-width tensile strength (kN/m) | Tensile strain (%) |
| Embodiment 1 | 25 | 96 | 54 | 10.3 | 10.5 | 4.2 | 20 | 34 | 10.3 |
| Embodiment 2 | 25 | 98 | 52 | 10.7 | 11.4 | 4.3 | 20 | 35 | 10.5 |
| Embodiment 3 | 25 | 95 | 53 | 11.0 | 10.2 | 4.4 | 20 | 38 | 10.2 |
| Embodiment 4 | 25 | 45 | 25 | 10.9 | 11.2 | 4.5 | 25 | 45 | 10.9 |
| Embodiment 5 | 25 | 67 | 38 | 10.7 | 11.0 | 4.3 | 25 | 39 | 10.7 |
| Embodiment 6 | 25 | 160 | 92 | 9.9 | 11.1 | 4.0 | 20 | 34 | 10.5 |
| Embodiment 7 | 25 | 158 | 90 | 10.5 | 10.4 | 4.2 | 20 | 35 | 10.6 |

Embodiment 8

A geogrid is produced in the same way as the third embodiment except that three glass fiber bundles of 2200 tex are used as a reinforcing fiber instead of polyester fiber.

The number of ribs per unit length (ribs/m), a wide-width tensile strength (kN/m), LASE2% (kN/m) and a tensile stain (%) of the produced geogrid are shown in the following table 2.

Embodiment 9

A geogrid is produced in the same way as the sixth embodiment except that six glass fiber bundles of 2200 tex are used as a reinforcing fiber for a longitudinal strip and three glass fiber bundles of 2200 tex are used as a reinforcing fiber for a lateral strip.

The number of ribs per unit length (ribs/m), a wide-width tensile strength (kN/m), LASE2% (kN/m), a tensile strain (%), a creep strain (%) and a strength reduction rate (%) of the produced geogrid are shown in the following table 2.

Embodiment 10

A geogrid is produced in the same way as the seventh embodiment except that six glass fiber bundles of 2200 tex are used as a reinforcing fiber for a longitudinal strip and three glass fiber bundles of 2200 tex are used as a reinforcing fiber for a lateral strip.

The number of ribs per unit length (ribs/m), a wide-width tensile strength (kN/m), LASE2% (kN/m) and a tensile strain (%) of the produced geogrid are shown in the following table 2.

TABLE 2

|  | Longitudinal strip | | | | | | Lateral strip | | |
| --- | --- | --- | --- | --- | --- | --- | --- | --- |
|  | No. of ribs (ribs/m) | Tensile strength (kN/m) | LASE2% (kN/m) | Tensile strain (%) | Strength reduction rate (%) | Creep strain (%) | No. of ribs (ribs/m) | Wide-width tensile strength (kN/m) | Tensile strain (%) |
| Embodiment 8 | 25 | 85 | 59 | 2.5 | 12.3 | 1.2 | 20 | 76 | 2.8 |
| Embodiment 9 | 25 | 144 | 102 | 2.4 | 11.7 | 1.2 | 20 | 72 | 2.6 |
| Embodiment 10 | 25 | 148 | 105 | 2.9 | 11.2 | 1.3 | 20 | 75 | 2.5 |

COMPARATIVE EXAMPLE 1

Polyester high-tenacity fiber bundles are woven into a lattice shape, and then coated with polyvinylchloride resin to produce a textile geogrid.

The number of ribs per unit length (ribs/m), a wide-width tensile strength (kN/m), LASE5% (kN/m), a tensile strain (%), a creep strain (%) and a strength reduction rate (%) of the produced geogrid are shown in the following table 3.

COMPARATIVE EXAMPLE 2

A plastic geogrid is produced according to a conventional method which is extruding a sheet with the use of polyolefin resin and then perforating and drawing the sheet on one axis.

The number of ribs per unit length (ribs/m), a wide-width tensile strength (kN/m). LASE5% (kN/m), a tensile strain (%), a creep strain (%) and a strength reduction rate (%) of the produced geogrid are shown in the following table 3.

COMPARATIVE EXAMPLE 3

Figure 12:
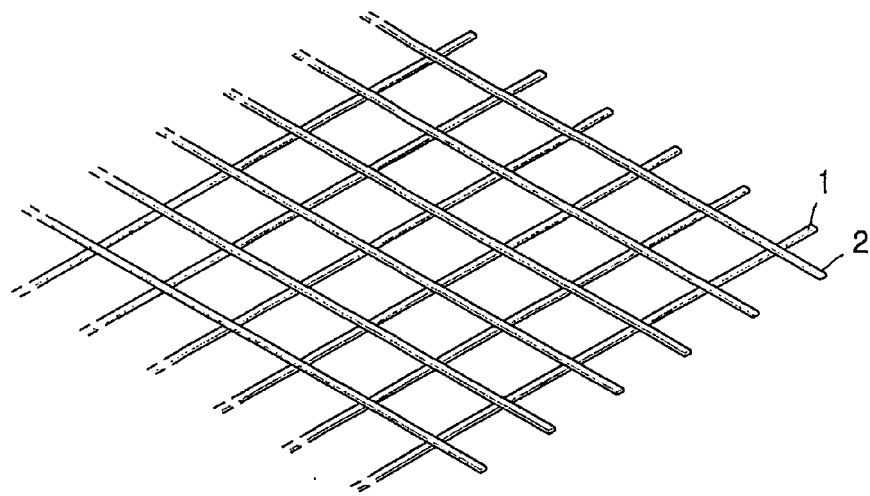
FIG. 12 is a perspective view showing a lattice shape of a conventional geogrid.

A geogrid is produced by making longitudinal and lateral fiber-reinforced strips in the same way as the first embodiment. However, the lateral fiber-reinforced strips are extruded and inserted while the longitudinal fiber-reinforced strips are moving, and then the longitudinal and lateral fiber-reinforced strips are adhered with compression rollers to produce a fiber-reinforced geogrid having a lattice shape as shown in FIG. 12 with a width of 4 m.

The number of ribs per unit length (ribs/m), a wide-width tensile strength (kN/m), LASE5% (kN/m), a tensile strain (%), a creep stain (%) and a strength reduction rate (%) of the produced geogrid are shown in the following table 3, and shape stability and interactive coefficient are shown in FIG. 4.

TABLE 3

|  | Longitudinal strip | | | | | | Lateral strip | | |
| --- | --- | --- | --- | --- | --- | --- | --- | --- |
|  | No. of ribs (ribs/m) | Tensile strength (kN/m) | LASE5% (kN/m) | Tensile strain (%) | Strength reduction rate (%) | Creep strain (%) | No. of ribs (ribs/m) | Wide-width tensile strength (kN/m) | Tensile strain (%) |
| Comparative Example 1 | 41 | 88 | 43 | 10.7 | 15.8 | 5.1 | 30 | 36 | 12.7 |
| Comparative Example 2 | 43 | 92 | 45 | 12.9 | 12.2 | 14.0 | — | — | — |
| Comparative Example 3 | 25 | 85 | 43 | 10.2 | 11.2 | 4.2 | 20 | 31 | 13.2 |

TABLE 4

| | Shape Stability | Interactive Coefficient ($C_i$) |
|---|---|---|
| Embodiment 1 | Superior | 0.95 |
| Comparative Example 3 | Inferior | 0.88 |

When properties of the geogrids according to the embodiments and the comparative examples 1 and 2 are compared with reference to Tables 1 to 3, the following differences will be found.

First, the geogrids of the embodiments and the geogrid of the comparative example 1 show similar values in the wide-width tensile strength (kN/m), LASE5% (kN/m), the tensile strain (%) and the creep strain (%), but the strength reduction rate (%) is larger in the textile geogrid of the comparative example 1 rather than the geogrids of the embodiments. The strength reduction rate (%) makes it possible to estimate the installation damage, and high strength reduction rate means poor resistance to installation damage. Thus, it will be understood that the geogrids according to the embodiments of the present invention shows excellent resistance to installation damage rather than the textile geogrid. It means that the geogrid of the present invention is usable in a soil having many rocks since the reinforcing fiber of the geogrid is protected by the polymer resin and any damage applied in construction may be prevented.

Second, the geogrids of the embodiments and the plastic geogrid of the comparative example 2 show similar values in the wide-width tensile strength (kN/m), LASE5% (kN/m) and the strength reduction rate (%), but they show some difference in the tensile strain (%) and the creep strain (%). In particular, the creep strain (%) of the comparative example 2 is three times of that of the embodiments. This shows that the plastic geogrid has lower resistance against the creep deformation rather than the geogrid of the present invention. That is to say, the conventional plastic geogrid shows high creep strain due to insufficient drawing at its junction points of longitudinal and lateral ribs when a load is applied thereto for a long time, while the geogrid of the present invention greatly improves resistance against the creep deformation since it is reinforced with the fiber having good resistance against the creep deformation.

In addition, if the properties of the geogrids of the embodiments are compared with those of the comparative example 3, the following differences are revealed.

Figure 13A:
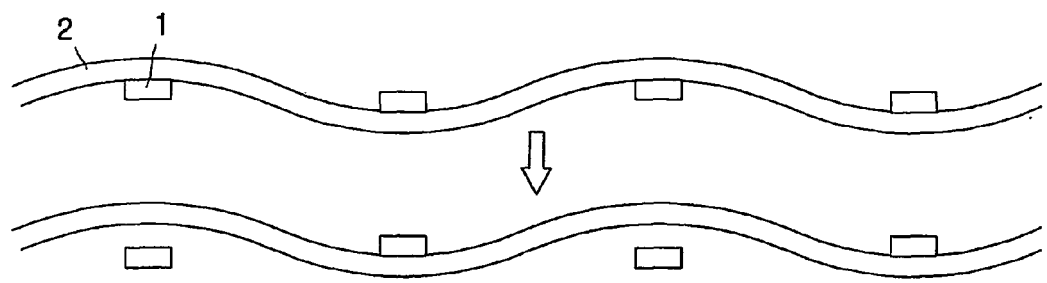
FIGS. 13a and 13b are schematic side views showing a separated state of the geogrid according to the first embodiment and the comparative example 3 while a vertical load is applied thereon.
Figure 13B:
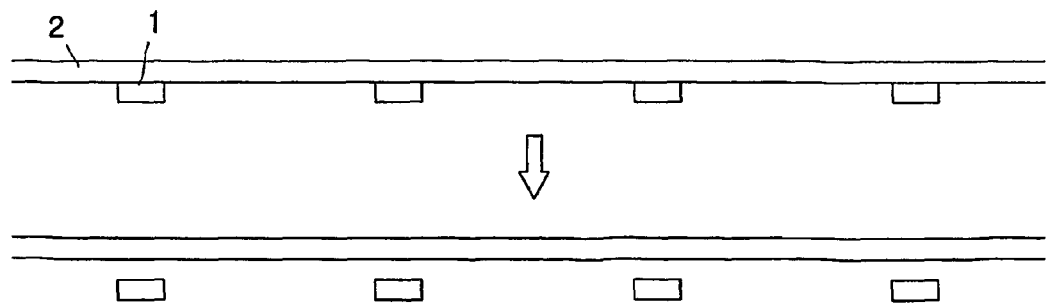

First, though the strength reduction rate is similar in both cases, the shape stability is very different. That is to say, the geogrid of the comparative example 3 is apt to easily separate its contact points by a vertical load (see FIG. 13b), while, in the geogrid of the present invention, only the contact points adhered below a lateral strip are separated due to the specific structure in which the longitudinal and lateral fiber-reinforced polymer strips are arranged up and down in turns (see FIG. 13a).

Second, after the interaction coefficients $C_i$ between the soil and the reinforcing material are compared, it is found that the interaction coefficient $C_i$ of the geogrid of the first embodiment is 0.95 and the interaction coefficient $C_i$ of the geogrid of the comparative example 3 is 0.88. That is to say, the interactive coefficient of the geogrid according to the first embodiment is higher than that of the geogrid according to the comparative example 3. In connection with this fact, the interaction coefficient is influenced by the shape of the geogrid, particularly by the shape of members positioned vertical to a pullout direction. In the experiment for the geogrid having the same width of 60 cm, the geogrid of the comparative example 3 is configured so that the strip positioned vertical to a pullout force has a length of 60 cm, but the geogrid of the first embodiment is configured so that the strip positioned vertical to a drawing force has a length of more than 60 cm since a curvature is generated in the strip due to the up/down alternative arrangement. Thus, the passive resistant member of the geogrid according to the present invention gives larger contact area with the soil than that of the comparative example 3, so the geogrid of the present invention may give more excellent reinforcing function.

INDUSTRIAL APPLICABILITY

As mentioned above, since the longitudinal and lateral fiber-reinforced polymer strips are alternatively arranged up and down and their cross contact points are welded and fixed to increase resistance against vertical load and frictional force with a reinforced material such as soil, the geogrid of the present invention gives excellent shape stability and superior resistance to installation damage. In addition, since the geogrid of the present invention uses the fiber-reinforced polymer strip in which a fiber is reinforced in a polymer resin, the geogrid of the present invention shows high tensile strength, low tensile strain and low creep strain. Thus, the geogrid of the present invention may be useful as a reinforcing material in various civil engineering works such as for retaining wall reinforcement, slope reinforcement or soft ground reinforcement and as a protecting net of a building or other installations.

In addition, by using the method for producing a geogrid according to the present invention, it is possible to mass-produce the geogrids at a low cost.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method for producing a geogrid, which includes longitudinal fiber-reinforced polymer strips reinforced with fibers or fiber bundles and lateral fiber-reinforced polymer strips reinforced with fibers or fiber bundles, the longitudinal fiber-reinforced polymer strips and the lateral fiber-reinforced polymer strips being interconnected at a plurality of junctions to form a lattice structure, by using a device provided with a strip arranging means, wherein the strip arranging means comprises an upper plate and a lower plate positioned to face the upper plate, wherein the upper plate, the lower plate, or both are moveable so that the upper and lower plates can come closer to and get away from each other within a predetermined distance, wherein a predetermined number of first bending members are formed on the lower surface of the upper plate and predetermined number of second bending members are formed on the upper surface of the lower plate, wherein the first bending members and the second bending members are formed along a plurality of lateral lines that are spaced apart from and are in parallel with each other and a plurality of longitudinal lines that are spaced apart from and are in parallel with each other such that the first and second bending members are formed at positions corresponding to the junctions of the lattice structure while they do not directly face each other, the method comprising:

(a) supplying the longitudinal fiber-reinforced polymer strips between the upper and lower plates along the plurality of longitudinal lines;

(b) moving the upper plate, lower plate, or both to become closer to each other such that all of the longitudinal fiber-reinforced polymer strips are pressed by the first and second bending members at the same time, thereby forming valleys in each of the longitudinal fiber-reinforced polymer strips at positions where the longitudinal fiber-reinforced polymer strips are pressed by the first bending members and ridges in each of the longitudinal fiber-reinforced polymer strips at positions where the longitudinal fiber-reinforced polymer strips are pressed by the second bending members, whereby the valleys and the ridges formed in all of the longitudinal fiber-reinforced polymer strips define closed spaces when viewed in a lateral direction;

(c) inserting the lateral fiber-reinforced polymer strips into the closed spaces such that one lateral fiber-reinforced polymer strip is inserted into each closed space, whereby the lateral fiber-reinforced polymer strips are crossed with the longitudinal fiber-reinforced polymer strips at positions corresponding to the junctions of the lattice structure; and (d) adhering the longitudinal fiber-reinforced polymer strips and the lateral fiber-reinforced polymer strips at the positions corresponding to the junctions of the lattice structure.

2. The method for producing a geogrid according to claim 1, wherein each of the first bending members is provided with a first pair of lateral support grooves and each of the second bending members is provided with a second pair of lateral support grooves, the first pairs of lateral support grooves and the second pairs of lateral support grooves being able to prevent the lateral fiber-reinforced polymer strips from being deviated when the lateral fiber-reinforced polymer strips are inserted in the step (c).

3. The method for producing a geogrid according to claim 1, wherein each of the first bending members is provided with a first pair of longitudinal support grooves and each of the second bending members is provided with a second pair of longitudinal support grooves, the first pairs of longitudinal support grooves and the second pairs of longitudinal support grooves being able to prevent the longitudinal fiber-reinforced polymer strips from being deviated when the longitudinal fiber-reinforced polymer strips are pressed in the step (b).

4. The method for producing a geogrid according to claim 1, wherein, in the step (d), the longitudinal fiber-reinforced polymer strips and the lateral fiber-reinforced polymer strips are adhered by a welding unit which includes a first welder and a second welder, the first welder comprising:

a first upper jig and a first lower jig which are faced with each other at an interval;

a plurality of first support holders protruded on the bottom surface of the first upper jig; and a plurality of first support holders protruded on the top surface of the first lower jig, and the second welder comprising:

a second upper jig and a second lower jig which are faced with each other at an interval;

a plurality of second support holders protruded on the bottom surface of the second upper jig; and a plurality of second support holders protruded on the top surface of the second lower jig.

5. The method for producing a geogrid according to claim 4, the method comprising:

(a) fixing fixing the first lower jig and vibrating the first upper jig while pressing upper surface portions of the longitudinal fiber-reinforced polymer strips and lower surface portions of the lateral fiber-reinforced polymer strips by the plurality of first support holders; and (b) fixing the second upper jig and vibrating the second lower jig while pressing upper surface portions of the lateral fiber-reinforced polymer strips and lower surface portions of the longitudinal fiber-reinforced polymer strips by the plurality of second support holders;

such that the longitudinal fiber-reinforced polymer strips and the lateral fiber-reinforced polymer strips are adhered at the positions corresponding to the junctions of the lattice structure.

6. The method for producing a geogrid according to claim 1, wherein, in the step (c), first contact points and second contact points are formed at the positions corresponding to the junctions of the lattice structure such that a lower surface portion of the longitudinal fiber-reinforced polymer strip is crossed with an upper surface portion of the lateral fiber-reinforced polymer strip at each of the first contact points and an upper surface portion of the longitudinal fiber-reinforced polymer strip is crossed with a lower surface portion of the lateral fiber-reinforced polymer strip at each of the second contact points, and wherein, in the step (d), the longitudinal fiber-reinforced polymer strips and the lateral fiber-reinforced polymer strips are adhered either at the first contact points and then at the second contacts or at the second contact points and then at the first contact points.

7. The method for producing a geogrid according to claim 1, wherein in the step (c), first contact points and second contact points are formed at the positions corresponding to the junctions of the lattice structure such that a lower surface portion of the longitudinal fiber-reinforced polymer strip is crossed with an upper surface portion of the lateral fiber-reinforced polymer strip at each of the first contact points and an upper surface portion of the longitudinal fiber-reinforced polymer strip is crossed with a lower surface portion of the lateral fiber-reinforced polymer strip at each of the second contact points, and wherein the first and second contact points are formed in turns in at least one of the longitudinal fiber-reinforced polymer strips, at least one of the lateral fiber-reinforced polymer strips, or both.

8. The method for producing a geogrid according to claim 7, wherein, in the step (d), the longitudinal fiber-reinforced polymer strips and the lateral fiber-reinforced polymer strips are adhered to each other at the first and second contact points.

9. The method for producing a geogrid according to claim 8, wherein the longitudinal fiber-reinforced polymer strips and the lateral fiber-reinforced polymer strips are adhered to each other by vibration welding, ultrasonic friction welding, heating adhesion, or any combination thereof.

10. The method for producing a geogrid according to claim 7, wherein the step (d) comprises fixing the longitudinal fiber-reinforced polymer strips and vibrating the lateral fiber-reinforced polymer strips.

11. The method for producing a geogrid according to claim 7, wherein the step (d) comprises fixing the lateral fiber-reinforced polymer strips and vibrating the longitudinal fiber-reinforced polymer strips.

12. The method for producing a geogrid according to claim 7, wherein in the step (d), the longitudinal fiber-reinforced polymer strips and the lateral fiber-reinforced polymer strips are adhered either at the first contact points and then at the second contacts or at the second contact points and then at the first contact points.

13. The method for producing a geogrid according to claim 1, wherein in the step (c), first contact points and second contact points are formed at the positions corresponding to the junctions of the lattice structure such that a lower surface portion of the longitudinal fiber-reinforced polymer strip is crossed with an upper surface portion of the lateral fiber-reinforced polymer strip at each of the first contact points and an upper surface portion of the longitudinal fiber-reinforced polymer strip is crossed with a lower surface portion of the lateral fiber-reinforced polymer strip at each of the second contact points, and wherein at least two second contact points are formed between two of the first contact points in at least one of the longitudinal fiber-reinforced polymer strips, at least one of the lateral fiber-reinforced polymer strips, or both.

14. The method for producing a geogrid according to claim 1, wherein in the step (c), first contact points and second contact points are formed at the positions corresponding to the junctions of the lattice structure such that a lower surface portion of the longitudinal fiber-reinforced polymer strip is crossed with an upper surface portion of the lateral fiber-reinforced polymer strip at each of the first contact points and an upper surface portion of the longitudinal fiber-reinforced polymer strip is crossed with a lower surface portion of the lateral fiber-reinforced polymer strip at each of the second contact points, and wherein at least two first contact points are formed between two of the second contact points in at least one of the longitudinal fiber-reinforced polymer strips, at least one of the lateral fiber-reinforced polymer strips, or both.

* * * * *